(12) United States Patent
Kumazaki et al.

(10) Patent No.: US 12,418,621 B2
(45) Date of Patent: Sep. 16, 2025

(54) INFORMATION PROCESSING APPARATUS, NON-TRANSITORY COMPUTER READABLE MEDIUM, AND INFORMATION PROCESSING METHOD

(71) Applicant: FUJIFILM CORPORATION, Tokyo (JP)

(72) Inventors: Takafumi Kumazaki, Kanagawa (JP); Yoshihide Sakai, Kanagawa (JP); Yukiko Kikuchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 321 days.

(21) Appl. No.: 18/056,669

(22) Filed: Nov. 17, 2022

(65) Prior Publication Data

US 2023/0247157 A1 Aug. 3, 2023

(30) Foreign Application Priority Data

Feb. 2, 2022 (JP) ................. 2022-015016

(51) Int. Cl.
*H04N 1/00* (2006.01)
(52) U.S. Cl.
CPC ....... *H04N 1/0097* (2013.01); *H04N 1/00511* (2013.01)
(58) Field of Classification Search
CPC .......... H04N 1/0097; H04N 1/00511
USPC ....................... 358/1.15
See application file for complete search history.

(56) References Cited

U.S. PATENT DOCUMENTS

| | | |
|---|---|---|
| 2015/0149923 A1 | 5/2015 | Shogaki |
| 2015/0261481 A1 | 9/2015 | Takenaka |
| 2016/0173714 A1* | 6/2016 | Nakahara ............. H04N 1/0097 358/1.13 |
| 2019/0095161 A1 | 3/2019 | Hamamoto |
| 2020/0012469 A1 | 1/2020 | Hamamoto |
| 2020/0195792 A1* | 6/2020 | Mizuno ............. H04N 1/00832 |
| 2023/0112103 A1* | 4/2023 | Ido .................... H04N 1/00832 358/1.15 |

FOREIGN PATENT DOCUMENTS

| | | |
|---|---|---|
| JP | 2007-028019 A | 2/2007 |
| JP | 2019-059136 A | 4/2019 |
| JP | 2021064865 A | 4/2021 |

OTHER PUBLICATIONS

Extended European Search Report dated Jun. 12, 2023, issued in corresponding EP Patent Application No. 22210077.8.

* cited by examiner

*Primary Examiner* — Allen H Nguyen
(74) *Attorney, Agent, or Firm* — SOLARIS Intellectual Property Group, PLLC

(57) ABSTRACT

An information processing apparatus includes a processor configured to: display a setting screen of setting information having on a per setting item basis a setting value used to perform a process, the setting information including personal setting information usable by only a specific user and shared setting information usable by multiple users; and receive, from only an administrative user having a wider right than a general user of the information processing apparatus, an operation to register the personal setting information as the shared setting information.

20 Claims, 27 Drawing Sheets

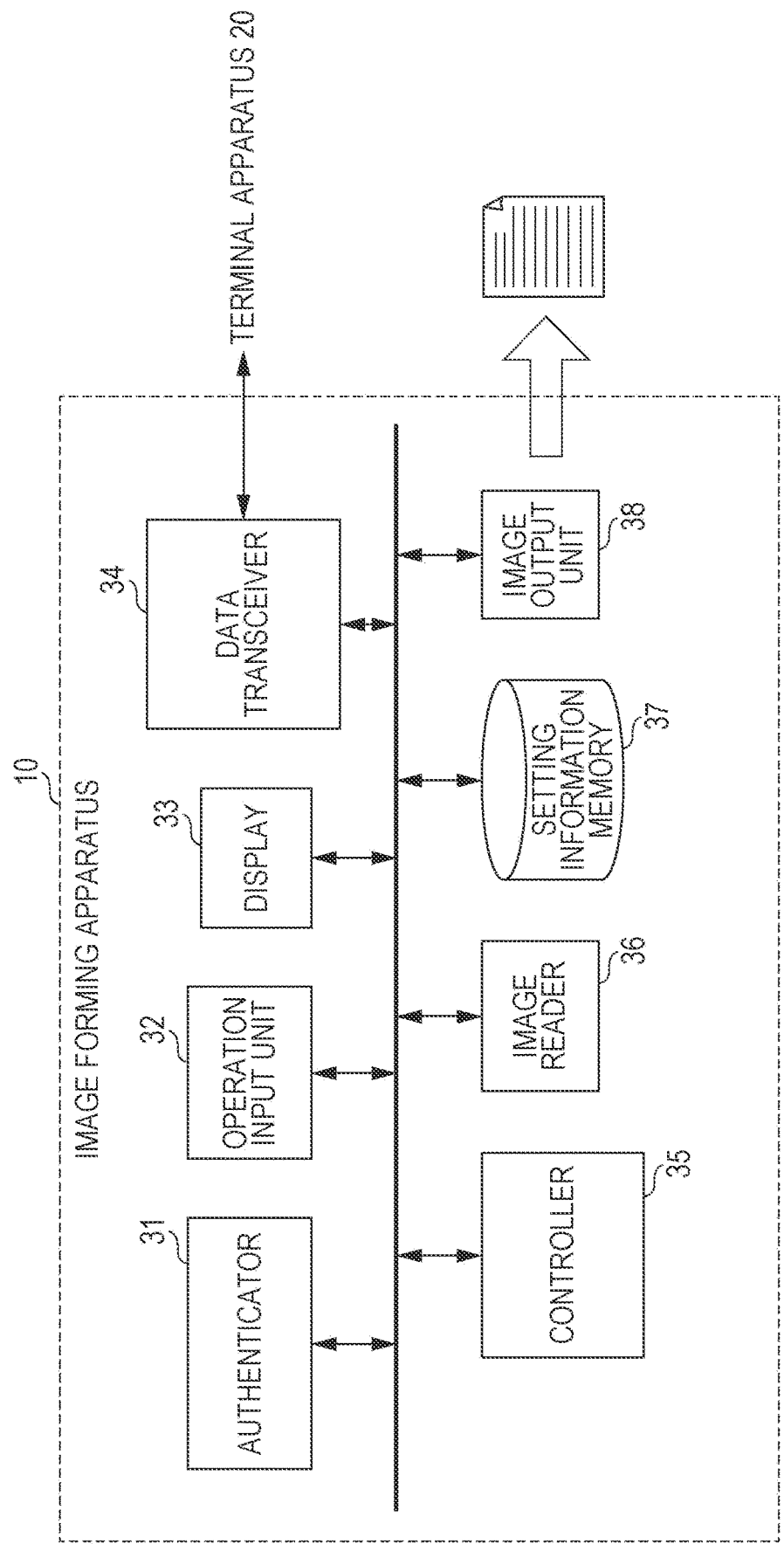

FIG. 4

| NAME | JOB TYPE | SETTING CONTENTS | DATE AND TIME OF LAST USE | PINNED |
|---|---|---|---|---|
| GENERAL AFFAIRS DEPARTMENT | FAX | DESTINATION: 03-1111-1111 IMAGE QUALITY: STANDARD | — | YES |
| FAX TO TRAVEL AGENCY | FAX | DESTINATION: 045-123-4567 IMAGE QUALITY: PHOTOGRAPH | — | YES |
| user3@sample.com | SCAN AND TRANSMIT | ADDRESS: user3@sample.com | 8/24/2021 16:03 | |
| COPY | COPY | NUMBER OF COPIES: 1 MONOCHROME, SIMPLEX 100%, SHEET SIZE: A4 | 8/24/2021 15:58 | |
| SELF-SCANNING | SCAN | ADDRESS: zzz@abcd.co.jp | 8/24/2021 10:23 | |
| SCANNING APPLICATION FORM | SCAN | ADDRESS: aaa@bbb.cc.com | 8/24/2021 9:22 | |
| .... | .... | .... | .... | |

First two rows: PINNED
Remaining rows: JOB LOG INFORMATION

FIG. 5

| NAME | JOB TYPE | SETTING CONTENTS |
|---|---|---|
| RECOMMENDED COPY SETTINGS | COPY | NUMBER OF COPIES: 1, MAGNIFICATION: 100%, COLOR SETTINGS: MONOCHROME, SHEET SIZE: A4, DUPLEX |
| SUPPORT CENTER | SCAN AND TRANSMIT | DESTINATION: 03-2222-2222, IMAGE QUALITY: STANDARD |
| FAX TO TRAVEL AGENCY | FAX | DESTINATION: 045-123-4567, IMAGE QUALITY: PHOTOGRAPH |

FIG. 16

| TYPE OF SETTING INFORMATION | SETTINGS OF DISPLAY ORDER | SETTINGS OF FOLDED DISPLAY |
|---|---|---|
| SHARED SETTING INFORMATION | 1 | 2 |
| PERSONAL SETTING INFORMATION (PINNED) | 2 | 2 |
| JOB LOG INFORMATION | — | 2 |

SETTINGS OF FOLDED DISPLAY
0: HIDDEN
1: FOLDED DISPLAY
2: STANDARD DISPLAY

FIG. 17

| TYPE OF SETTING INFORMATION | SETTINGS OF DISPLAY ORDER | SETTINGS OF FOLDED DISPLAY |
|---|---|---|
| SHARED SETTING INFORMATION | 2 | 1 |
| PERSONAL SETTING INFORMATION (PINNED) | 1 | 2 |
| JOB LOG INFORMATION | — | 0 |

SETTINGS OF FOLDED DISPLAY
0: HIDDEN
1: FOLDED DISPLAY
2: STANDARD DISPLAY

FIG. 24

| | SHARED COPY<br>RECOMMENDED COPY SETTINGS: MONOCHROME, DUPLEX | ... |
| --- | --- | --- |
| | FAX<br>GENERAL AFFAIRS DEPARTMENT | ... |
| | COPY<br>1 COPY, MONOCHROME, SIMPLEX, 100%, A3 | 8/24/2021 16:03 ... |
| | SCAN AND TRANSMIT (NORMAL END)<br>user3@sample.com | 8/24/2021 15:58 ... |
| | ... | |

FIG. 26

| | SETTINGS TO DELETE SHARED SETTING INFORMATION ON SAVE REGION |
|---|---|
| SETTING 1 | DELETE BECAUSE UPPER LIMIT NUMBER IS EXCEEDED |
| SETTING 2 | DELETE BECAUSE SPECIFIC PERIOD OF TIME HAS ELAPSED |

FIG. 28

| | | |
|---|---|---|
| 🔊 | SHARED COPY<br>RECOMMENDED COPY SETTINGS: MONOCHROME, DUPLEX | ... |
| 🔊 | SHARED SCAN AND TRANSMIT<br>SUPPORT CENTER | ... |
| 🔊 | FAX<br>GENERAL AFFAIRS DEPARTMENT | ... |
| 🔊 | COPY<br>RECOMMENDED SETTINGS: MONOCHROME, DUPLEX | ... |
| ▯ | COPY<br>1 COPY, MONOCHROME, SIMPLEX, 100%, A3 | 8/24/2021 16:03 |
| ▯ | SCAN AND TRANSMIT (NORMAL END)<br>user3@sample.com | 8/24/2021 15:58 |
| | ... | |

69, 72

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-015016, filed on Feb. 2, 2022, the entire disclosure of which is incorporated by reference herein.

BACKGROUND

(i) Technical Field

The present disclosure relates to an information processing apparatus, a non-transitory computer readable medium, and an information processing method.

(ii) Related Art

Japanese Unexamined Patent Application Publication No. 2007-28019 discloses a job log management apparatus. To manage a job log of multiple devices, the disclosed job log management apparatus stores the job log. When a job log is received from one of the devices, the jog log management apparatus corrects the received job log such that the job log is also usable on the devices other than the device having transmitted the job log.

Japanese Unexamined Patent Application Publication No. 2019-59136 discloses an image forming apparatus. The image forming apparatus stores a job parameter shared by a group including multiple image forming apparatuses and corrects the job parameter, if the job parameter is difficult to process with a capability of the image formation apparatus, in a manner such that the job parameter is processable with the capability.

In one of available functions, a setting value at each setting item of a process performed in the past is stored as setting information and the stored setting information is used such that a process having the same setting contents as the process performed in the past may be performed. In such a function, if setting information used frequently by multiple users is registered as shared setting information, the users may use the same setting information.

However, if a general user of an apparatus is authorized to freely register personal setting information as shared setting information, unwanted shared setting information may be registered.

An authoritative user responsible for management of apparatuses in such a case is forced to verify the shared setting information later and perform an operation to delete or modify the shared setting information as appropriate. The authoritative user may be involved in a time-consuming operation including managing the shared setting information.

SUMMARY

Aspects of non-limiting embodiments of the present disclosure relate to providing an information processing apparatus, a non-transitory computer readable medium, and an information processing method facilitating the management of the shared setting information in comparison with when a general user of an apparatus is authorized to register the personal setting information as the shared setting information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: display a setting screen of setting information having on a per setting item basis a setting value used to perform a process, the setting information including personal setting information usable by only a specific user and shared setting information usable by multiple users; and receive, from only an administrative user having a wider right than a general user of the information processing apparatus, an operation to register the personal setting information as the shared setting information.

BRIEF DESCRIPTION OF THE DRAWINGS

Exemplary embodiment of the present disclosure will be described in detail based on the following figures, wherein:

FIG. 3 is a block diagram illustrating a functional configuration of the image forming apparatus of the exemplary embodiment of the disclosure;

FIG. 4 illustrates an example of a personal setting information management table stored on a setting information memory;

FIG. 5 illustrates an example of the personal setting information management table stored on the setting information memory;

FIG. 16 illustrates an example of default setting values when the display settings in a list display of the setting information are modified from user to user;

FIG. 17 illustrates an example of the display settings that are modified in the list display of the setting information from the default setting values;

FIG. 24 illustrates how the shared setting information referred to as the support center is deleted from the list display screen of the setting information;

FIG. 26 illustrates a setting example displayed when the shared setting information temporarily stored on the save region is completely deleted;

FIG. 28 illustrates how, with the shared setting information remaining intact, the personal setting information having the same setting contents as the shared setting information is newly produced and added onto the list display screen.

DETAILED DESCRIPTION

Exemplary embodiment of the disclosure is described in detail with reference to the drawings.

Figure 1:
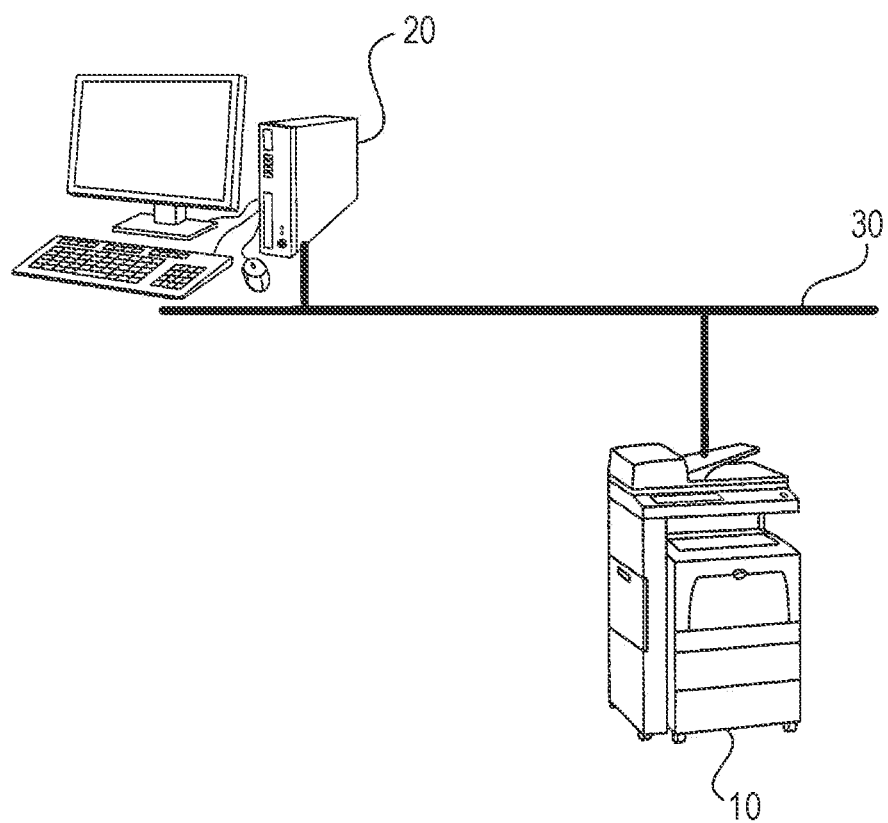
FIG. 1 illustrates a system configuration of an image forming system of an exemplary embodiment of the disclosure.

FIG. 1 illustrates a system configuration of an image forming system of the exemplary embodiment of the disclosure.

Referring to FIG. 1, the image forming system of the exemplary embodiment of the disclosure includes an image forming apparatus 10 and terminal apparatus 20 mutually interconnected to each other via a network 30. The terminal apparatus 20 generates print data and transmits the generated print data to the image forming apparatus 10 via the network 30. The image forming apparatus 10 receives the print data transmitted from the terminal apparatus 20 and outputs an image responsive to the print data onto a paper sheet. The image forming apparatus 10 is a multi-function apparatus having multiple functions including a print function, scan function, copy function, fax function, and other functions.

Figure 2:
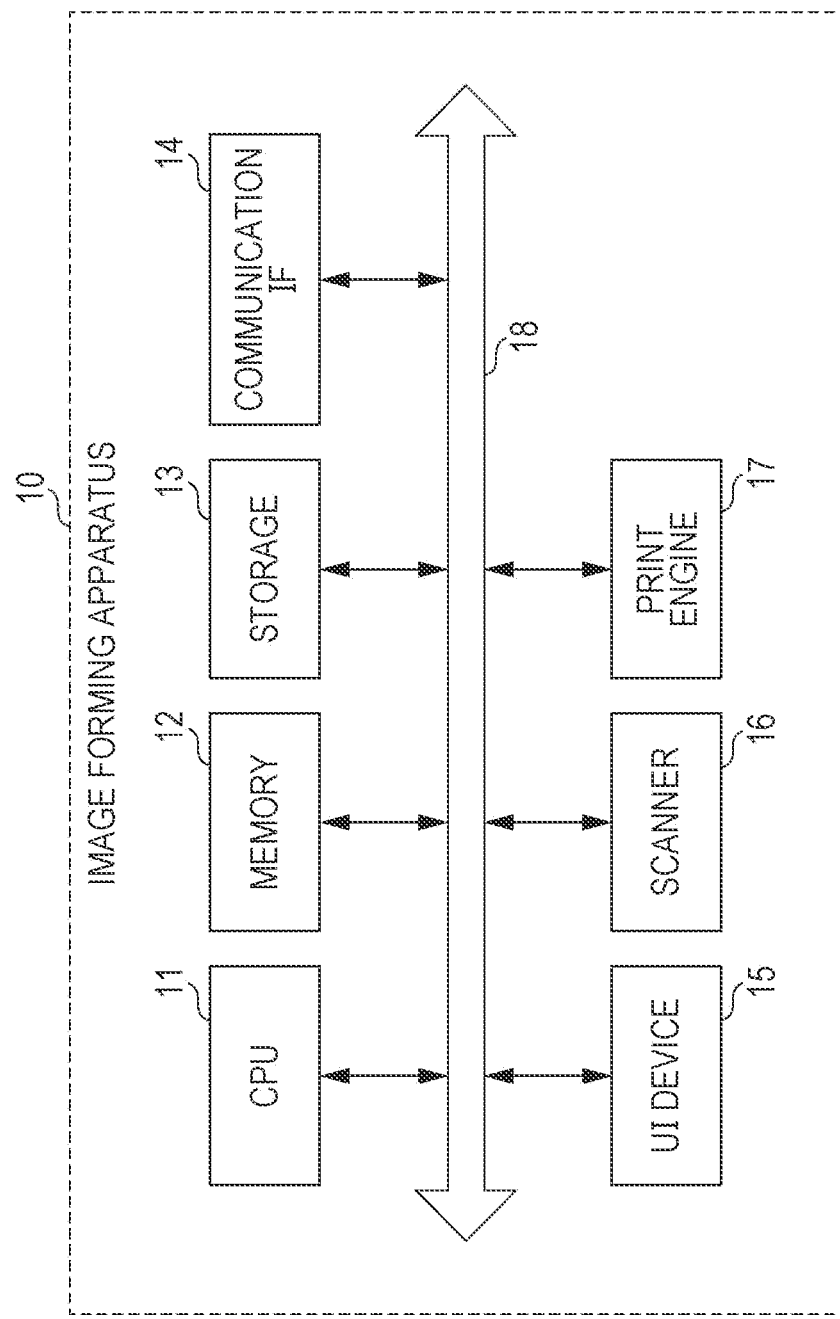
FIG. 2 is a block diagram illustrating a hardware configuration of an image forming apparatus of the exemplary embodiment of the disclosure.

FIG. 2 illustrates a hardware configuration of the image forming apparatus 10 in the image forming system of the exemplary embodiment.

Referring to FIG. 2, the image forming apparatus 10 includes a central processing unit (CPU) 11, memory 12, storage 13, such as a hard-disk drive, communication interface (IF) 14 that transmits or receives data to or from an external apparatus via the network 30, user interface (UI) 15 including a touch panel, liquid-crystal display, and keyboard, scanner 16, and print engine 17. These elements are interconnected to each other via a control bus 18.

The print engine 17 prints an image onto a recording medium, such as a paper sheet, through charging, exposure, development, transfer, fixing and other operations.

The CPU 11 performs a predetermined process and controls the process of the image forming apparatus 10 in accordance with a control program stored on the memory 12 or the storage 13. According to the exemplary embodiment, the CPU 11 reads the control program from the memory 12 or the storage 13 and executes the read control program. The disclosure is not limited to this method. Alternatively, the control program may be delivered in a recorded form on a computer readable recording medium. For example, the control program may be delivered in a recorded form on a compact disc read-only memory (CD-ROM), digital versatile disc ROM (DVD-ROM), or semiconductor memory, such as a universal serial bus (USB) memory or memory card. The control program may be acquired from an external apparatus via a communication network connected to the communication IF 14.

FIG. 3 is a block diagram illustrating a functional configuration of the image forming apparatus 10 that is implemented by executing the control program.

Referring to FIG. 3, the image forming apparatus 10 of the exemplary embodiment includes an authenticator 31, operation input unit 32, display 33, data transceiver 34, controller 35, image reader 36, setting information memory 37 and image output unit 38.

The authenticator 31 performs an authentication operation on a user that uses the image forming apparatus 10. The display 33 is controlled by the controller 35 and displays a variety of information to the user. The operation input unit 32 enters a variety of operation information on operations performed by the user.

The data transceiver 34 transmits or receives data to or from an external apparatus, such as the terminal apparatus 20.

The controller 35 controls the overall process of the image forming apparatus 10. The controller 35 performs control to generate print data in accordance with a print job received from the terminal apparatus 20 via the data transceiver 34, and output the generated data from the image output unit 38 and performs control to read a document image via the image reader 36. The setting information memory 37 stores job log information and setting information. The job log information indicates an execution log of a variety of jobs performed by the controller 35, including a print job, scan job, copy job, and fax transmission job. The setting information includes a setting value set at each setting item when a process is performed. The job log information is log information having process contents of a job executed in the past.

The image output unit 38 under the control of the controller 35 outputs an image onto a recording medium, such as a print paper sheet. The image reader 36 under the control of the controller 35 reads a document image from a set original document.

The setting information memory 37 stores a personal setting information management table and shared setting information management table, each table used to manage setting information including a setting value at each setting item used to perform a process. The personal setting information management table manages the personal setting information that is the setting information usable by only a specific user. The shared setting information management table manages the shared setting information that is the setting information usable by multiple users.

FIG. 4 illustrates an example of the personal setting information management table stored on the setting information memory 37.

Referring to FIG. 4, the personal setting information management table includes job log information listing the name of a job executed in the past, type of the job, setting contents, and date and time of last use, and personal setting information, pinned by a user operation out of the job log information. If a user wants to perform a job having the same setting contents as the job executed in the past, the user may perform the job of the same setting contents in terms of the setting value in the job log information by selecting the job log information. It is noted that the job log information includes the personal setting information usable by only a specific user. Specifically, the job log information is the personal setting information in a depinned state. In the discussion that follows, the setting information pinned and usable by only the specific user is referred to as the personal setting information and the setting information depinned and usable by only the specific user is referred to as the job log information.

When a user has executed a job using the image forming apparatus 10, new job log information is generated. However, a data storage region is limited, and the data storage region may possibly be insufficient to store all the job log information. For this reason, an upper limit of the job log information may be set, for example, the job log information for only the latest 200 jobs may be permitted to remain. If the upper limit is exceeded, the job log information in excess of the upper limit is deleted on an oldest-first basis.

A job log the user does not want delete may be pinned to indicate that job log is not a deletion target. The pinned job log is managed as the personal setting information and even when the upper limit is exceeded by the addition of a job performed later, the pinned job log is free from deletion and remains left.

Referring to the personal setting information management table in FIG. 4, the setting information having the names "general affairs department," and "fax to travel agency" is pinned and thus managed separately from standard job log information. Specifically, the pinned personal setting information remains left regardless of the number of jobs performed later and continues to be displayed on an operation screen. If frequently used job log information is registered as the personal setting information by pinning the frequently used job log information, the job having the same setting contents may be performed by using that personal setting information many times.

The personal setting information and the job log information illustrated in FIG. 4 are setting information usable by a specific user, such as a user A. However, multiple users may want use such setting information. In view of this, the personal setting information may be modified to the shared setting information. It is noted that the shared setting information may be usable by all the users.

FIG. 5 illustrates an example of the shared setting information management table used to manage the shared setting information.

Referring to FIG. 5, the shared setting information management table is used to manage information including the name of each job, type of the job, and setting contents.

Referring to the shared setting information management table in FIG. 5, the shared setting information having the name "recommended copy settings" has a job type "copy" and setting contents for the copy are stored. For example, in the "recommended copy settings" as the shared setting information, a setting value "1 copy" is set at a setting item "number of copies," and a setting value "100%" is set at a setting item "magnification."

However, if a general user of an apparatus is permitted to freely register the personal setting information as the shared setting information, other users may register shared setting information having similar setting contents and there is a possibility that unwanted shared setting information may be added. A large number of pieces of the setting information may be thus registered and it is difficult to select one piece of the shared setting information from the other pieces and it is thus difficult to use the shared setting information.

In such a situation, an authoritative user in charge of managing the apparatuses verifies the shared setting information later, is to perform an operation, such as deleting or modifying, and is involved in time-consuming operations to manage the shared setting information.

When the display 33 displays a setting screen including the personal setting information and shared setting information, the controller 35 receives, from only the authoritative user having a wider right than the general user of the apparatus, an operation to register the personal setting information as the shared setting information.

The general user is permitted to use the apparatus of the general user but is not permitted to modify settings on the apparatus. The authoritative user is also referred to as a "machine operator" and is granted a wider right than the general user by requesting authentication, for example, inputting a special password.

Specifically, only the authoritative user of the image forming apparatus 10 is permitted to register, delete or edit the shared setting information. The general users other than the authoritative user may select the shared setting information and perform a job in accordance with the process contents of the shared setting information.

To implement the limitation described above, the controller 35 displays to only the authoritative user an operator used to register the personal setting information as the shared setting information. In other words, the controller 35 does not display to the general user the operator used to register the personal setting information as the shared setting information.

By performing a predetermined authentication process on the authoritative user, the controller 35 permits the authoritative user to perform operations that are not available to the general users and include, for example, an operation to register the personal setting information as the shared setting information.

If an excess number of the shared setting information is registered, it is difficult to determine which pieces of the shared setting information to select. For this reason, the controller 35 may perform control to receive from the authoritative user an upper limit to the number of registrable pieces of the shared setting information and may perform control not to receive the registration of pieces of the shared setting information in excess of the received upper limit number. The upper limit number may be modified by an operation of the authoritative user. For example, if the upper limit number of the pieces of the shared setting information is 10 in a default state, the authoritative user may increase the upper limit number to 12 or may decrease the upper limit number to 8.

When the setting screen including the personal setting information and shared setting information is displayed on the display 33, the controller 35 displays the shared setting information above the personal setting information in the default setting state.

When the setting screen is displayed, the controller 35 may receive, in response to an operation of the authoritative user or the general user, a setting as to whether the shared setting information is displayed above the personal setting information or the personal setting information is displayed above shared setting information.

When the setting screen is displayed, the controller 35 may receive, in response to an operation of the authoritative user or the general user, a setting as to whether to display or hide each piece of the shared setting information, the personal setting information, and the job log information when the process is performed.

If the numbers of pieces of the shared setting information, the personal setting information, and the job log information increase, the setting screen becomes difficult to view, and deciding which piece of the setting information or the job log information to select also becomes difficult. The controller 35 may thus receive an operation of the authoritative user or the general user and then display multiple pieces of the shared setting information, multiple pieces of the personal setting information, or multiple pieces of the job log information as a representative form of the setting information or a representative form of the job log information.

In response to the reception of an operation of the authoritative user or the general user, the controller 35 may display the pieces of the shared setting information, the pieces of the personal setting information, or the pieces of the job log information in an original separate fashion thereof in place of the representative form of the setting information or the representative form of the job log information.

As described above, the authoritative user may delete the shared setting information. However, if the authoritative user accidentally deletes the shared setting information that is to remain left, the authoritative user may have to restore the shared setting information. If the setting screen deleted at one operation is fully deleted, it is difficult to restore the shared setting information to an original state thereof. If the shared setting information is deleted, the controller 35 may store the deleted shared setting information onto a temporary save region. The authoritative user may select the shared setting information stored on the temporary save region and restore the shared setting information to the original state.

If the deleted shared setting information is stored for a long time, a memory capacity may be consumed in vain. The controller 35 may thus delete the shared setting information stored on the temporary save region after the elapse of a predetermined time period, for example, 24 hours later. If the number of pieces of the shared setting information stored on the temporary save region exceeds a predetermined upper limit number, for example, 20, the controller 35 may delete the shared setting information by a number of pieces in excess of the upper limit number on an oldest-first basis.

If a general user frequently uses specific shared setting information of the registered shared setting information, that general user may want to keep the shared setting information under control. When an operation to make a copy of the shared setting information for the personal setting information is received, the controller 35 may register, as the personal setting information of the user having performed the operation, the setting information of the same setting contents as the setting contents of the shared setting information of the copy operation.

The controller 35 may receive, not only from the authoritative user but also from a general user, an operation to make a copy of the shared setting information as the personal setting information.

The process of the image forming apparatus 10 of the exemplary embodiment is described in detail with reference to the drawings.

By selecting the job log information, the personal setting information, or the shared setting information, the image forming apparatus 10 of the exemplary embodiment provides as a quick function a function that performs a new job using the setting contents of a job performed in the past.

Figure 6:
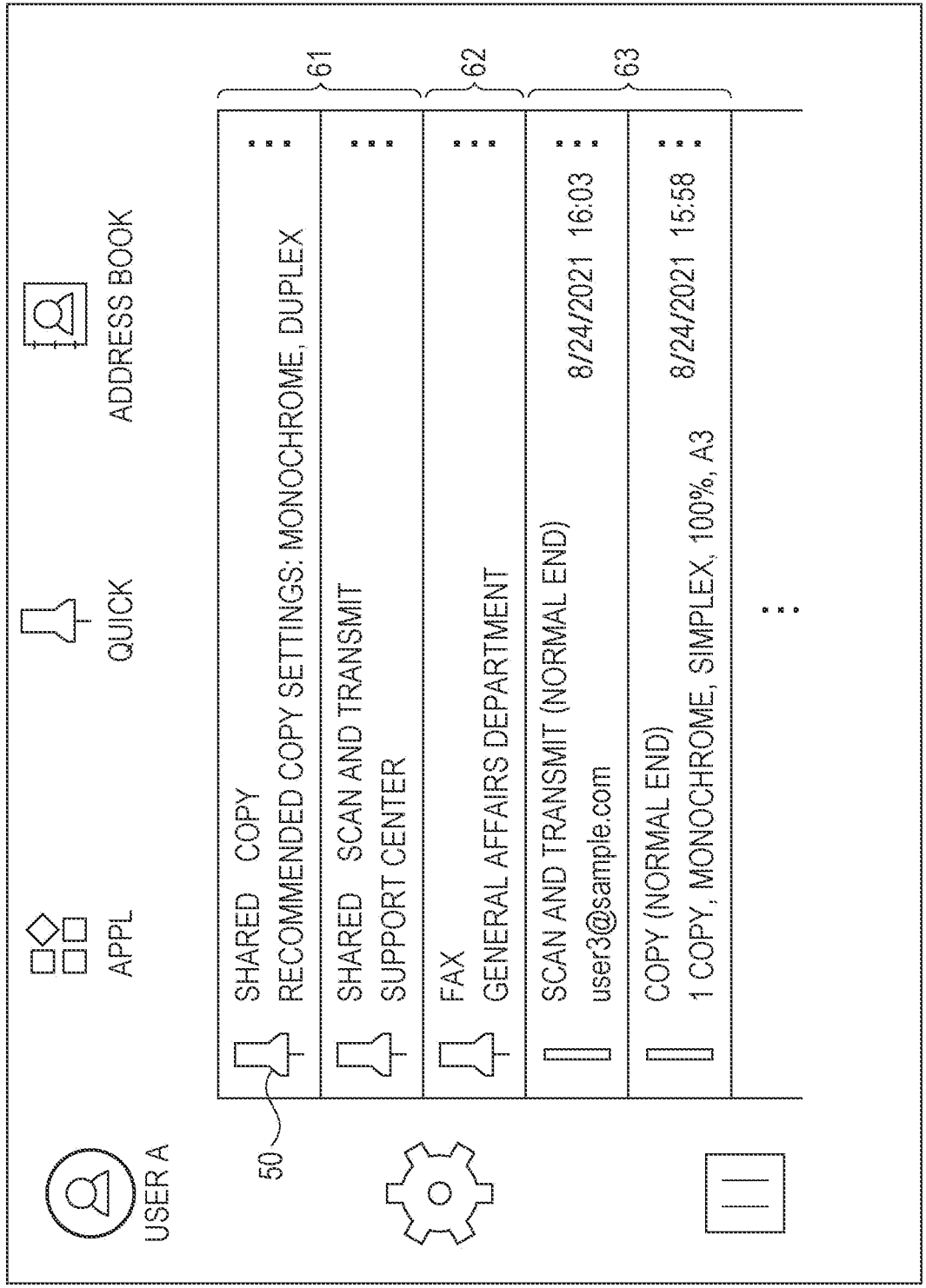
FIG. 6 illustrates an example of a display screen displayed when an icon used to use a quick function is touched by a user.

FIG. 6 illustrates a display screen example displayed when a user touches an icon used to use the quick function.

The display screen example in FIG. 6 displays a list of shared setting information 61, personal setting information 62, and job log information 63.

The display screen example of the quick function in FIG. 6 is displayed when a user A logs in with the personal setting information management table in FIG. 4 and the shared setting information management table in FIG. 5 stored on the setting information memory 37. With limited display space, part of the job log information to be displayed on a list display screen of the job log is not illustrated.

The display screen example in FIG. 6 displays the shared setting information 61 and personal setting information 62 with pin mark 50 attached thereto and indicating a pinned state.

As a new job is performed, the job log information 63 is successively deleted on an oldest-first basis. The shared setting information 61 and personal setting information 62 with the pin mark 50 attached thereto remain intact even with a new job performed. The shared setting information 61 and personal setting information 62 with the pin mark 50 attached thereto remain intact continue to be displayed at the same display position thereof.

In order to perform a job having the same setting contents of a past performed job, the user may perform the job of desired setting contents without entering detailed settings, by simply selecting a job having the setting contents identical or similar to the setting contents of the job to be performed out of a displayed list of the shared setting information 61, the personal setting information 62, and the job log information 63.

For example, by simply selecting the shared setting information having the name "support center," the user may reliably perform "scan and transmit" to the same destination in a similar way without entering destination information and a variety of setting values.

The process of the image forming apparatus 10 of the exemplary embodiment is described with reference to flowcharts in FIGS. 7 through 9.

Figure 7:
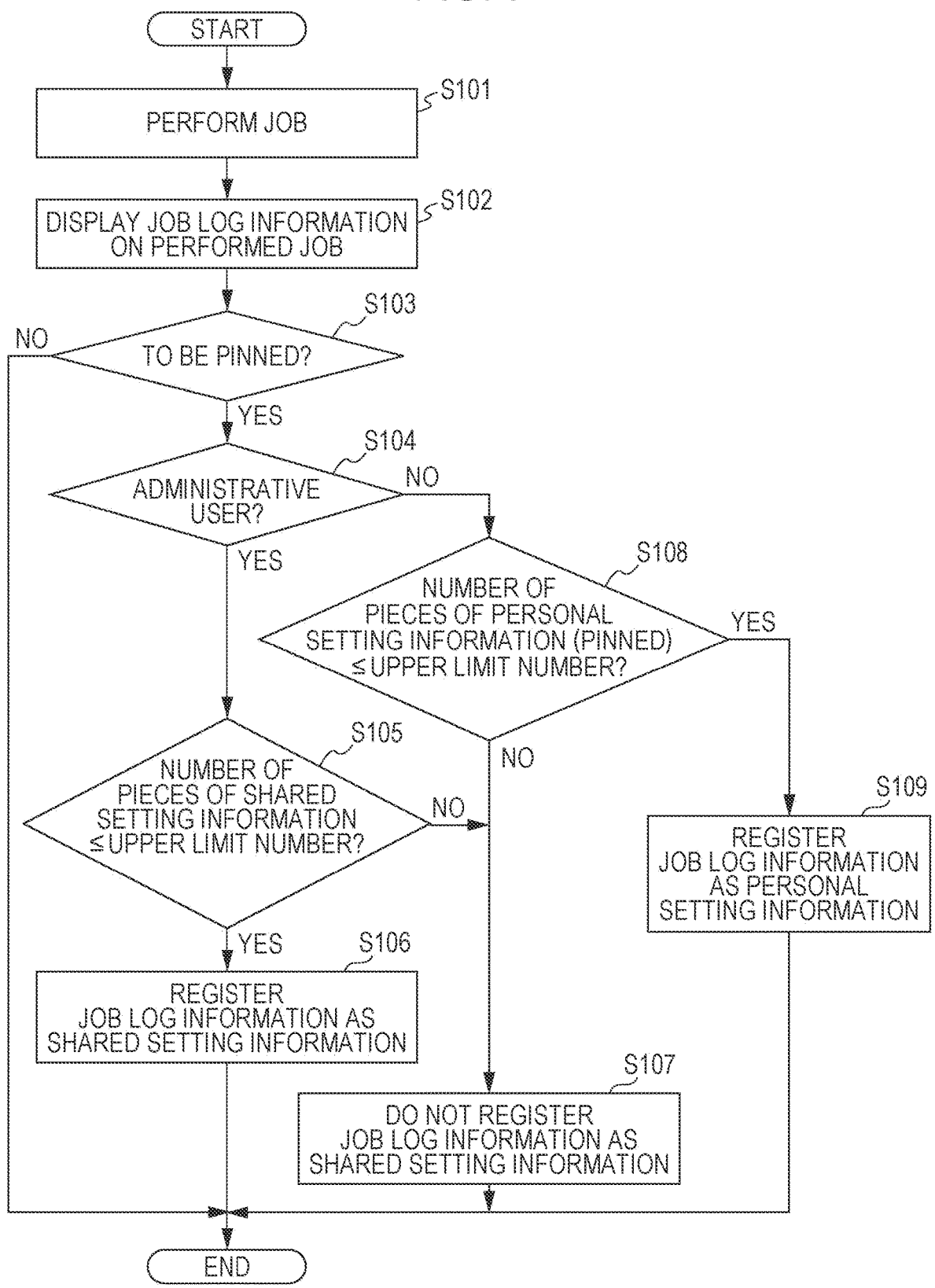
FIG. 7 is a flowchart illustrating a process performed when a user has performed a job and job log information on the job is registered as shared setting information or personal setting information.

The flowchart in FIG. 7 illustrates the process to register as the shared setting information or the personal setting information the job log information on a job that has been performed by a user.

When the job is performed in response to an instruction from the user in step S101, the controller 35 displays on the display screen the job log information on the performed job in step S102.

If the user gives an instruction to pin the job log information in step S103, the controller 35 determines in step S104 whether the user is an authoritative user.

If the user does not give an instruction to pin the job log information in step S103, the controller 35 ends the process.

If the controller 35 determines in step S104 that the user is an authoritative user, the controller 35 determines in step S105 whether the number of pieces of the shared setting information currently registered is equal to or below a set upper limit number. If the controller 35 determines in step S105 that the number of pieces of the shared setting information currently registered is equal to or below the set upper limit number, the controller 35 registers the pinned job log information as the shared setting information in step S106.

If the controller 35 determines in step S105 that the number of pieces of the shared setting information currently registered is above the set upper limit number, the controller 35 does not register as the shared setting information the job log information in step S107.

If the controller 35 determines in step S104 that the user is not an authoritative user, in other words, the user is a general user, the controller 35 determines in step S108 whether the number of pieces of the personal setting information currently registered is equal to or below the set upper limit number. If the controller 35 determines in step S108 that the number of pieces of the personal setting information currently registered is equal to or below the set upper limit number, the controller 35 registers the pin job log information as the personal setting information in step S109.

The controller 35 determines in step S108 that the number of pieces of the personal setting information currently registered is above the set upper limit number, the controller 35 does not register the pinned job log information as the personal setting information in step S107.

As described above, the image forming apparatus 10 of the exemplary embodiment gives the right to register the shared setting information to only the authoritative user having a wider right than the general user. For this reason, the authoritative user is enabled to centrally manage the shared setting information and may control an occurrence of an event, such as the registration of new shared setting information without the authoritative user knowledge.

In the image forming apparatus 10 of the exemplary embodiment, only the authoritative user has the right to delete the shared setting information.

Figure 8:
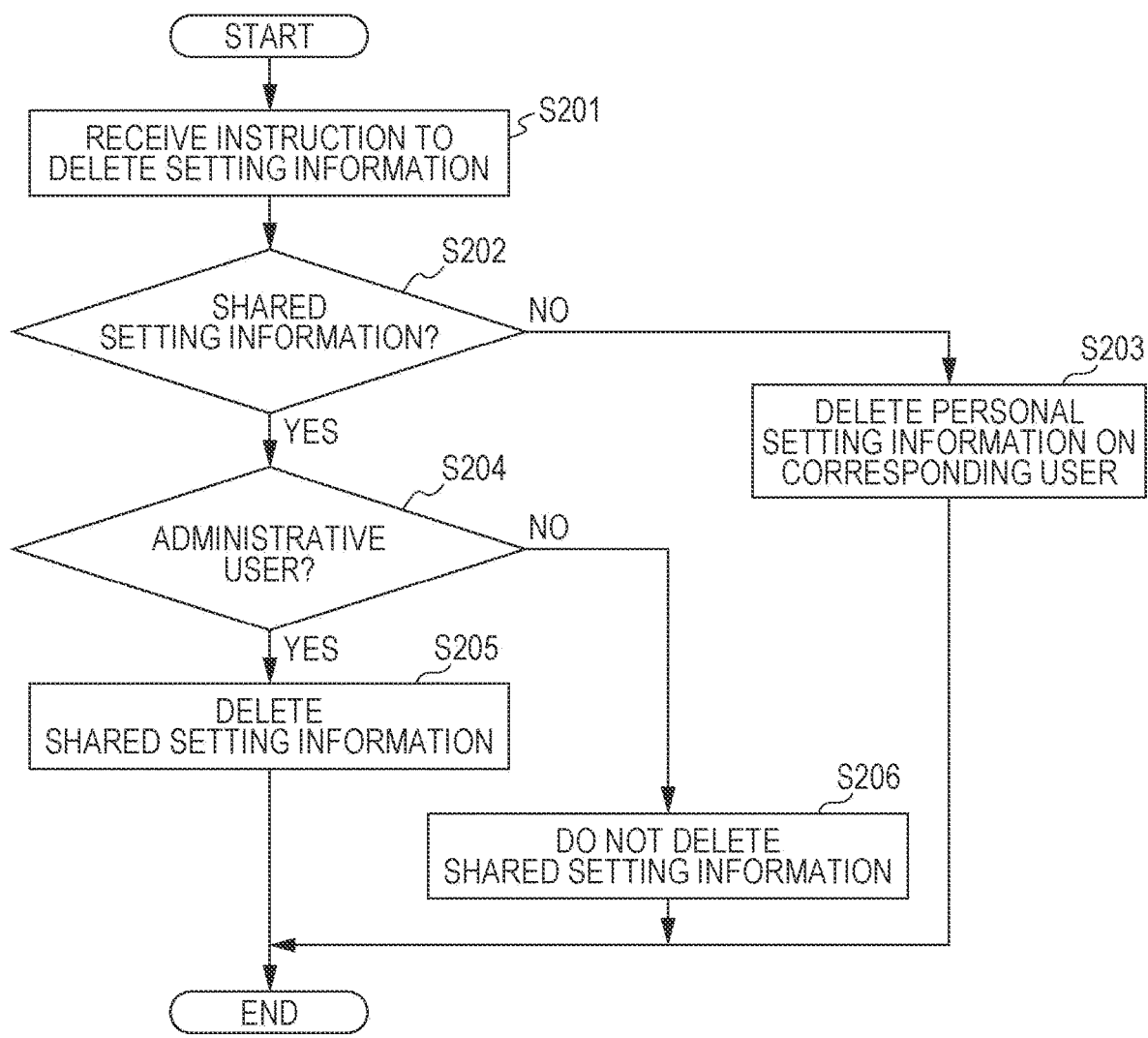
FIG. 8 is a flowchart illustrating a process performed when the user selects and deletes specific setting information.

FIG. 8 is a flowchart of a process in which the user selects and deletes setting information.

When an instruction to delete specific setting information is received from the user in step S201, the controller 35 determines whether the setting information responsive to the deletion instruction is the shared setting information or the personal setting information.

If the setting information responsive to the deletion instruction is determined to be the shared setting information in step S202, the controller 35 determines in step S204 whether the user is an authoritative user.

If the user is determined to be an authoritative user in step S204, the controller 35 deletes in step S205 the shared setting information responsive to the deletion instruction. Specifically, the controller 35 deletes the shared setting information responsive to the deletion instruction from the shared setting information management table illustrated in FIG. 5.

If the user is not determined to be an authoritative user in step S204, namely, the user is determined to be a general user, the controller 35 does not delete the shared setting information responsive to the deletion instruction in step S206.

If the setting information responsive to the deletion instruction is not determined to be the shared setting information in step S202, in other words, the setting information responsive to the deletion instruction is determined to be the personal setting information, the controller 35 deletes in step S203 the personal setting information responsive to the deletion instruction.

Figure 9:
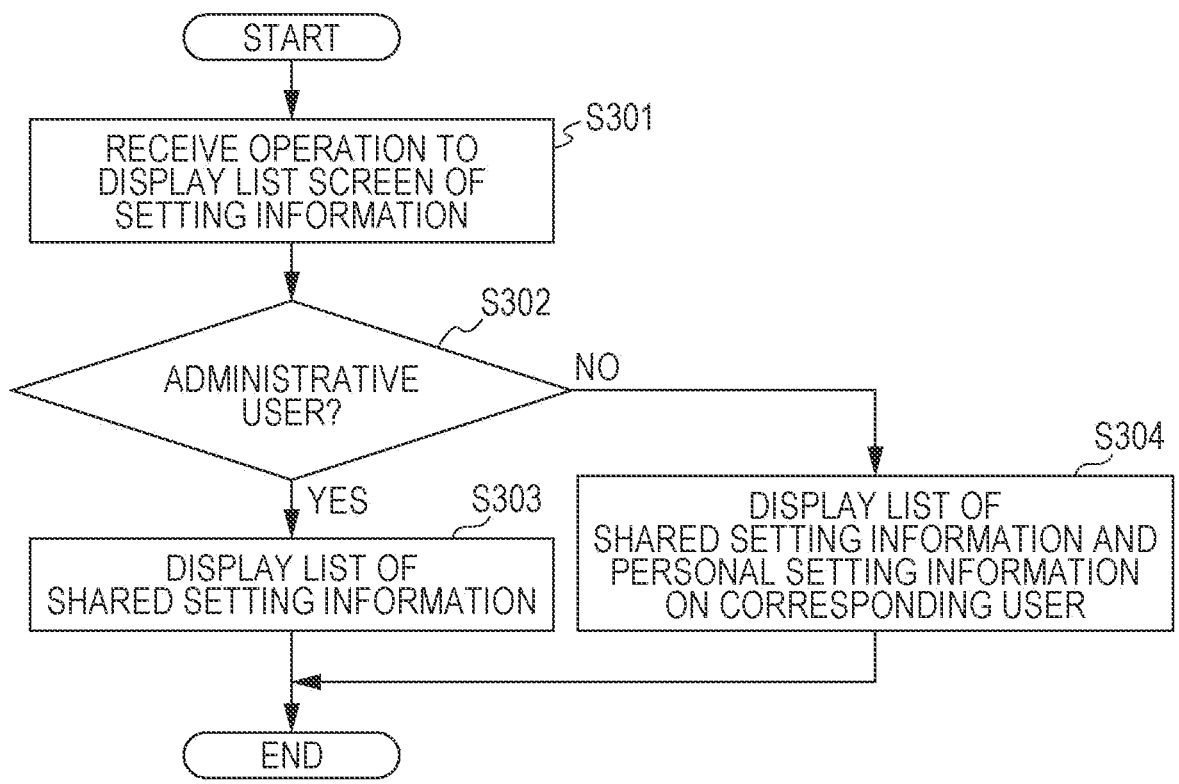
FIG. 9 is a flowchart illustrating a process performed when the user displays a list screen of the setting information.

FIG. 9 illustrates a flowchart of a process in which the user performs an operation to display a list screen of the setting information. For convenience of explanation, the process related to displaying the job log information is omitted herein.

When the operation to display the list screen of the setting information is received from the user in step S301, the controller 35 determines in step S302 whether the user is an authoritative user.

If the user is determined to be an authoritative user in step S302, the controller 35 displays a list of the shared setting information on the display screen in step S303.

If the user is not determined to be an authoritative user in step S302, in other words, the user is determined to be a general user, the controller 35 displays on the display screen a list of the shared setting information and personal setting information in step S304.

The list of the shared setting information is displayed to the authoritative user and both the shared setting information and the personal setting information are displayed to the general user.

The process of the image forming apparatus 10 of the exemplary embodiment is described below in accordance with operation examples performed on an actual display screen.

Figure 10:
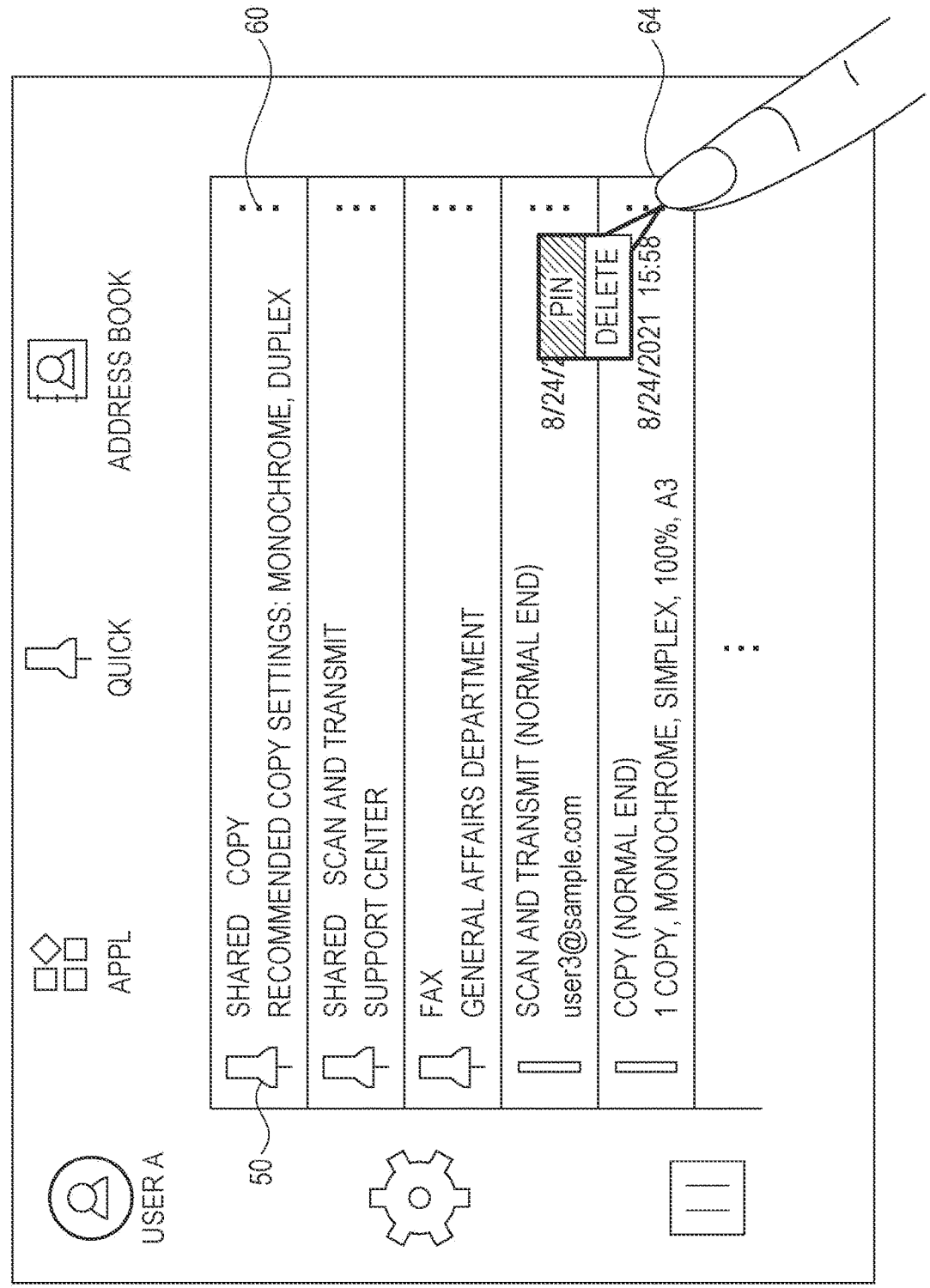
FIG. 10 illustrates an example of an operation performed when a general user registers the personal setting information by pinning job log information.
Figure 11:
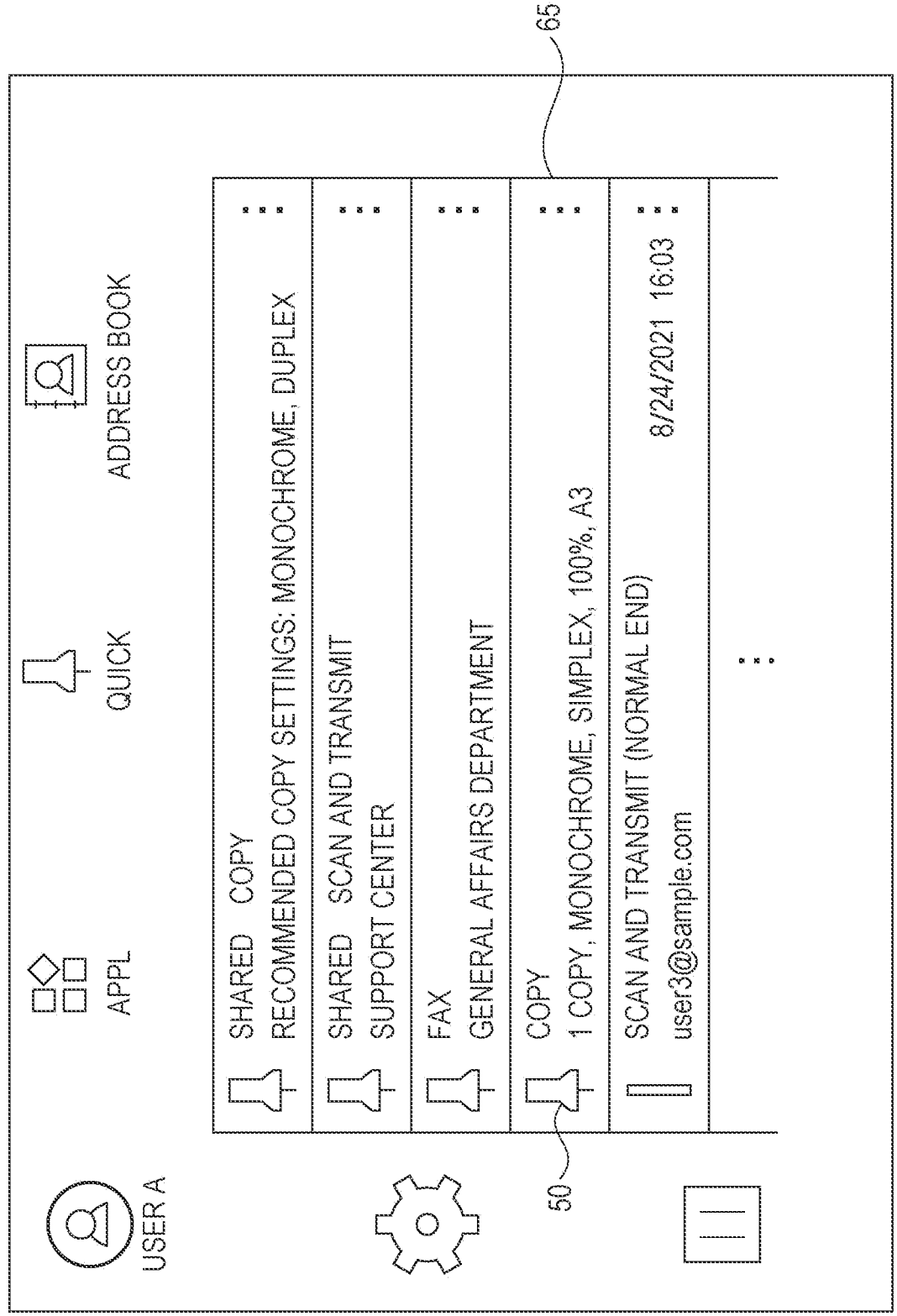
FIG. 11 illustrates an example of an operation screen displayed after the job log information is pinned and thus modified to the personal setting information.

FIGS. 10 and 11 illustrate the operation examples in which a general user registers the personal setting information by pinning the job log information.

The display screen in FIG. 10 displays an operation menu button 60 for each pieces of the shared setting information, the personal setting information, and the job log information such that a variety of operations may be performed.

For example, FIG. 10 illustrates an operation menu displayed when the operation menu button 60 in job log information 64 is operated by a user A as a general user.

The operation screen in FIG. 10 displays the operation menu including operation items "pin," and "delete." If the user selects the operation item "pin" in the operation menu, the job log information 64 is pinned and then modified to the personal setting information.

FIG. 11 illustrates an operation screen example when the job log information 64 is pinned and then modified to personal setting information 65.

FIG. 11 indicates that the pinning of the job log information 64 illustrated in FIG. 10 produces the new personal setting information 65 with the pin mark 50 attached thereto.

Figure 12:
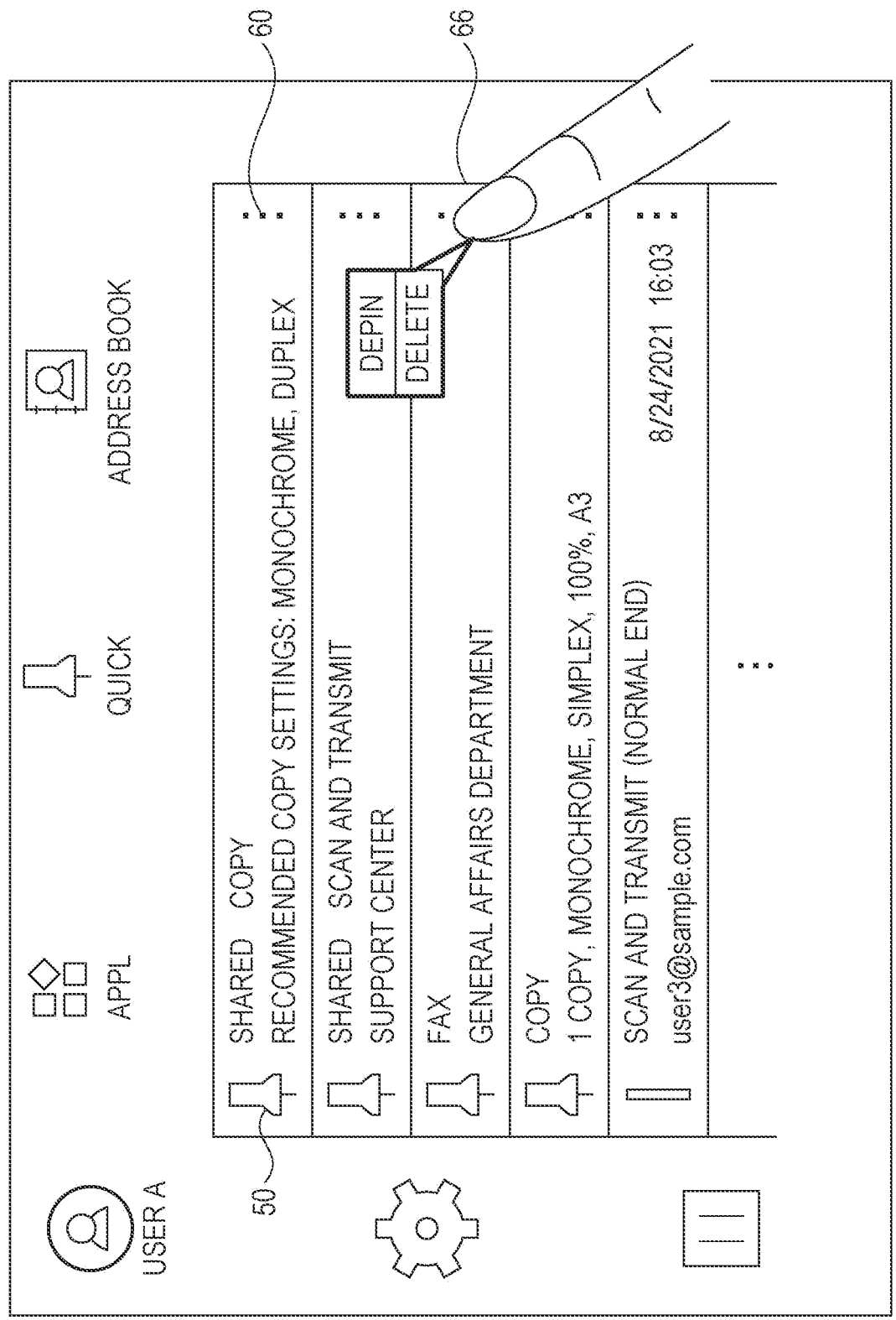
FIG. 12 illustrates an example of an operation menu displayed when an operation menu button is operated in the personal setting information in a pinned state.

FIG. 12 illustrates an operation menu screen displayed when the operation menu button 60 in personal setting information 66 in the pinned state is operated by the user A.

When the operation menu button 60 of the pinned personal setting information is operated by the user A as illustrated in FIG. 12, the operation menu indicates operation items "depin," and "delete." If the user A selects the operation item "depin," the pinned state is canceled on the personal setting information 66 and standard job log information is thus restored. If the user A selects the operation item "delete" from the operation menu, the personal setting information 66 is deleted.

Figure 13:
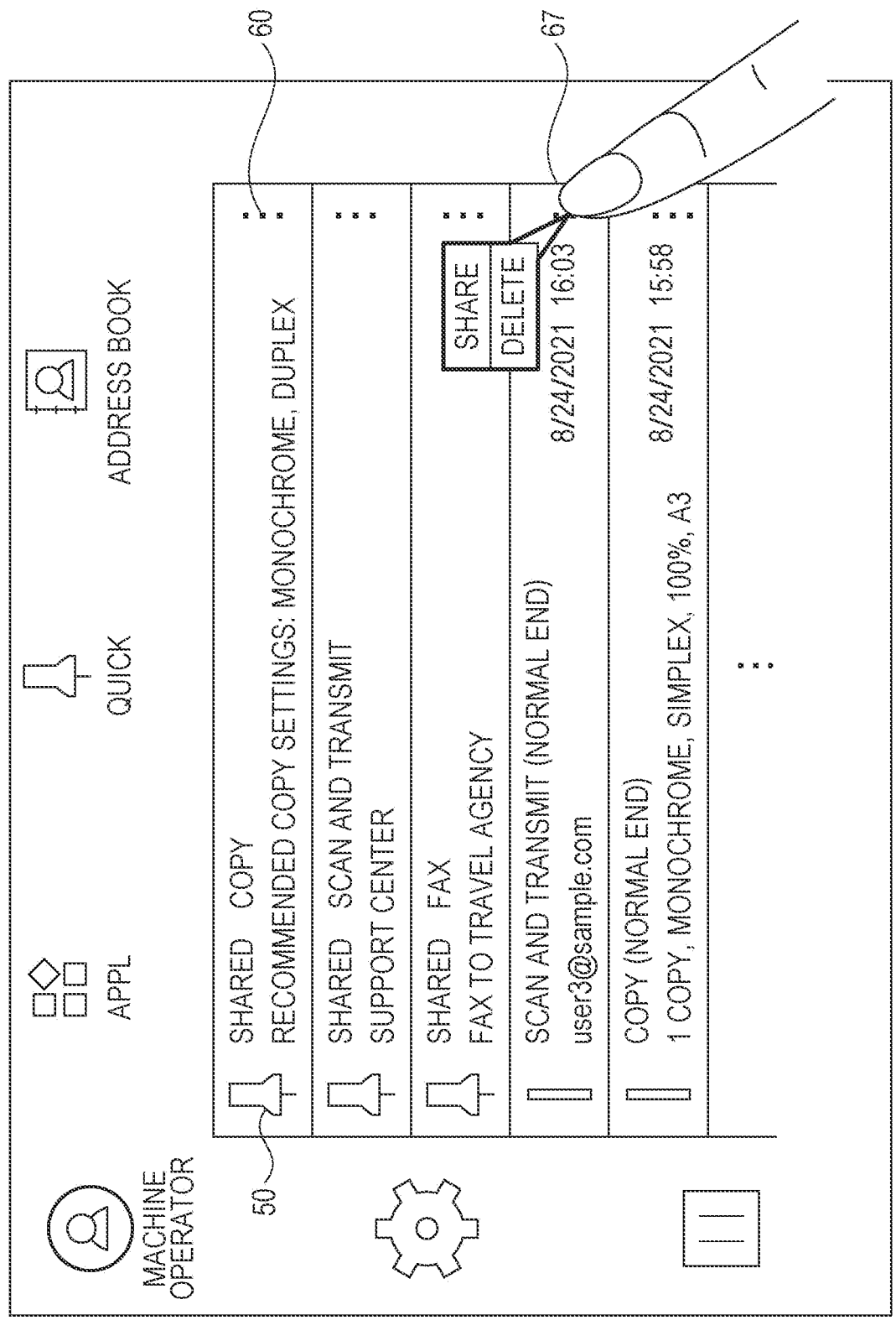
FIG. 13 illustrates an operation example performed when an administrative user registers new setting information.
Figure 14:
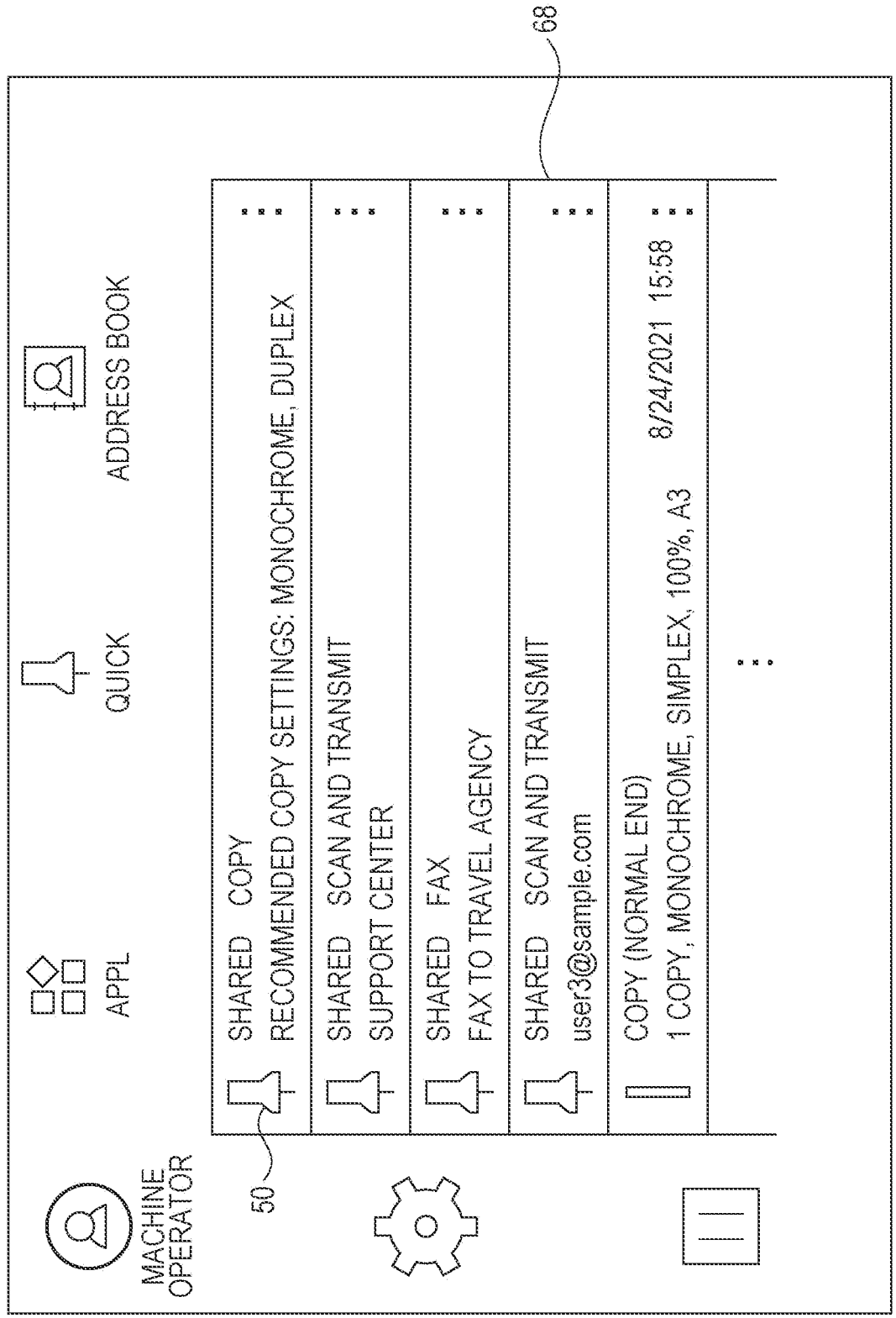
FIG. 14 illustrates an operation screen example displayed after job log information is modified to shared setting information.

FIGS. 13 and 14 illustrate operation examples performed when the authoritative user logs in on the image forming apparatus 10 and registers new shared setting information.

Referring to FIG. 13, the authoritative user may log in on the image forming apparatus 10 and operate the operation menu button 60 of the job log information having a name "user3@sample.com." The operation menu displays operation items "share," and "delete." If the authoritative user selects the operation item "share" from the operation menu, job log information 67 is registered as shared setting information.

FIG. 14 illustrates an operation screen example after the job log information 67 is modified to shared setting information 68.

Figure 15:
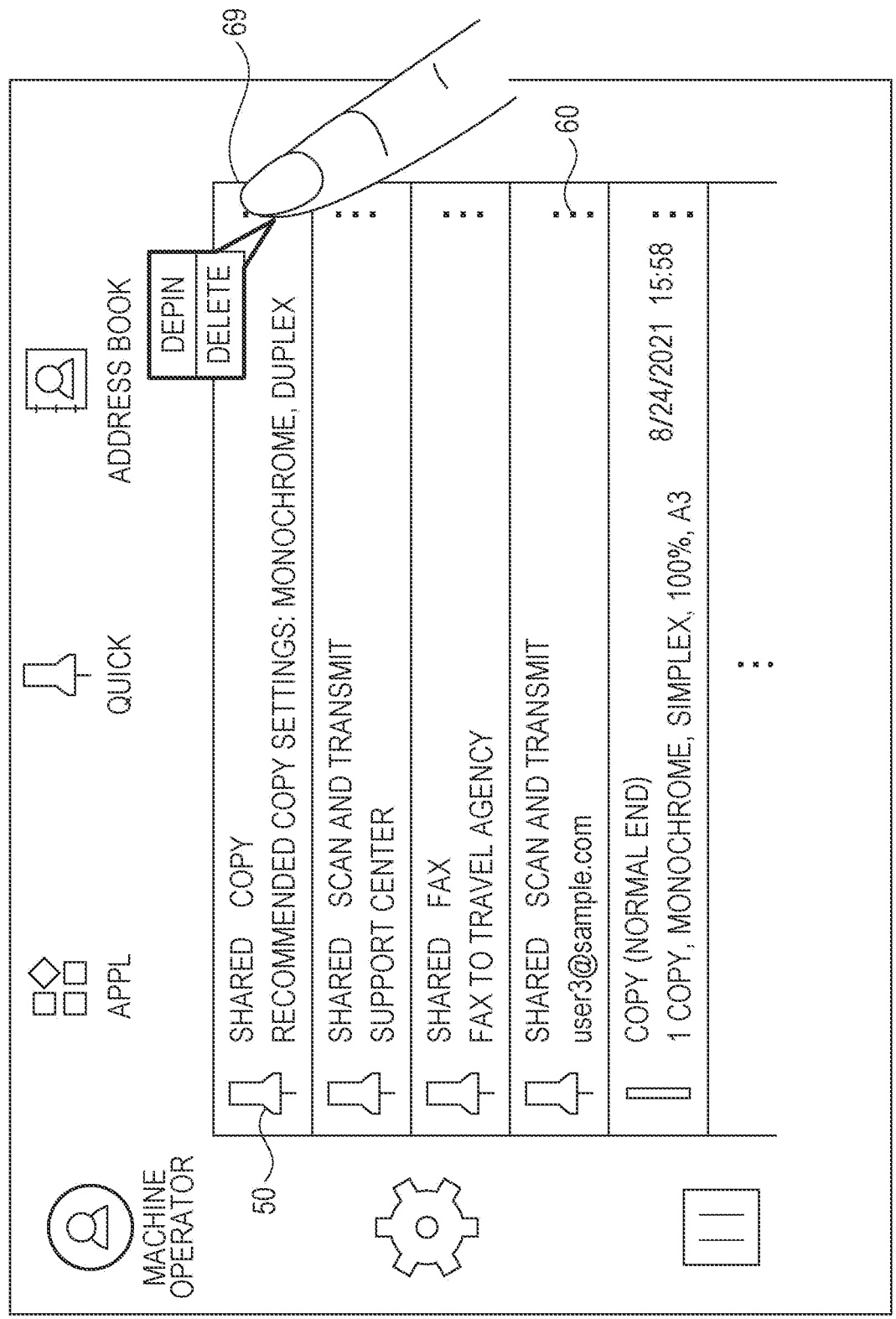
FIG. 15 illustrates an operation example performed when the shared setting information registered by an authoritative user is deleted.

FIG. 14 indicates that the sharing of the job log information 67 in FIG. 13 has produced the new shared setting information 68 with the pin mark 50 attached thereto. FIG. 15 illustrates an operation example displayed when the authoritative user logs in on the image forming apparatus 10 and deletes the registered shared setting information.

When the authoritative user operates the operation menu button 60 of the registered shared setting information 69 as illustrated in FIG. 15, the operation menu displays operation items "depin," and "delete." If the authoritative user selects the operation item "delete" from the operation menu, the shared setting information 69 is deleted.

As described above, only when the authoritative user logs in, the operation item "share" serving as an operator used to register the job log information as the shared setting information is displayed in the operation menu. Specifically, the controller 35 does not display the operation item "share" in the operation menu to the general users.

Similarly, only when the authoritative user logs in, the operation item "delete" serving as an operator used to delete the shared setting information is displayed in the operation menu with the operation menu for the shared setting information displayed. Specifically, the controller 35 does not display the operation item "delete" in the operation menu to the general user when the operation menu for the shared setting information is displayed.

As a result, the authoritative user may register new shared setting information or delete registered shared setting information. The image forming apparatus 10 may thus control the occurrence of events, such as the registration of new shared setting information or deletion of registered setting screen without the authoritative user knowledge. The authoritative user may centrally control the shared setting information.

An operation to modify the setting contents in the registered shared setting information has not been described. It is also noted that only the authoritative user may modify the setting contents of the shared setting information.

The shared setting information produced and registered in the operations described above is displayed on the display screen of the quick function of all the users. All the users may thus perform the job of the same setting contents.

Such shared setting information is usable by all the users, and when the display screen of the quick function is displayed, the shared setting information is displayed above the personal setting information in the default setting state.

Specifically, the shared setting information 61 is displayed above the personal setting information 62 and job log information 63 in the display screen in FIG. 6.

It is contemplated that a user may more frequently use the personal setting information pinned by that user than the shared setting information. If the shared setting information is displayed above the personal setting information at all times, operations may be more difficult depending on the user. If the number of pieces of the shared setting information is too many with the shared setting information arranged above the personal setting information, the personal setting information may be displayed far below on the screen and difficult to use.

Depending on the user, the job log information may not be displayed but only both the shared setting information and personal setting information may be displayed.

In view of this, the image forming apparatus 10 of the exemplary embodiment may change the order of display of the shared setting information and personal setting information from user to user. The image forming apparatus 10 of the exemplary embodiment may change the appearance of the shared setting information, personal setting information and job log information in connection with whether to display the information in a standard display or hide the information or whether to display the information in a folded display. The folded display refers to displaying multiple pieces of the setting information as a representative form of the setting information. The standard display refers to displaying the multiple pieces of the setting information in an unfolded form.

FIG. 16 illustrates a default setting value example when the display setting is changed from user to user. In the default setting value example in FIG. 16, the display order of the shared setting information is set to "1" and the display order of the personal setting information is set to "2." Specifically, according to the display order, the shared setting information is displayed above the personal setting information. In the initial setting value example in FIG. 16, the setting value of the folded display of the shared setting information, personal setting information, and job log information is set to "2." The setting value "2" of the folded display setting signifies a "standard display." The setting value "0" of the folded display setting signifies "hidden display," and the setting value "1" of the folded display setting signifies "folded display."

If the folded display setting of specific setting information is the "hidden display," the setting information is not displayed on the display screen. If the folded display setting of specific setting information is the "folded display," the setting information is folded in a single form of the setting information on the display screen.

FIG. 17 illustrates a display setting example displayed when the display setting of the setting information is modified from default setting values. FIG. 17 herein illustrates the display setting example of the setting information on the user A.

In the display setting in FIG. 17, the display order of the shared setting information is set to "2," and the display order of the personal setting information is set to "1." Specifically, the shared setting information is displayed below the personal setting information in the display order.

In the display setting in FIG. 17, the setting value of the folded display setting of the shared setting information is "1" and thus the folded display is set. The setting value of the folded display setting of the personal setting information is "2" and thus the standard display is set. The setting value of the folded display setting of the job log information is "O" and thus the hidden display is set.

In this way, each user may set the display order in the list display of the setting information.

Figure 18:
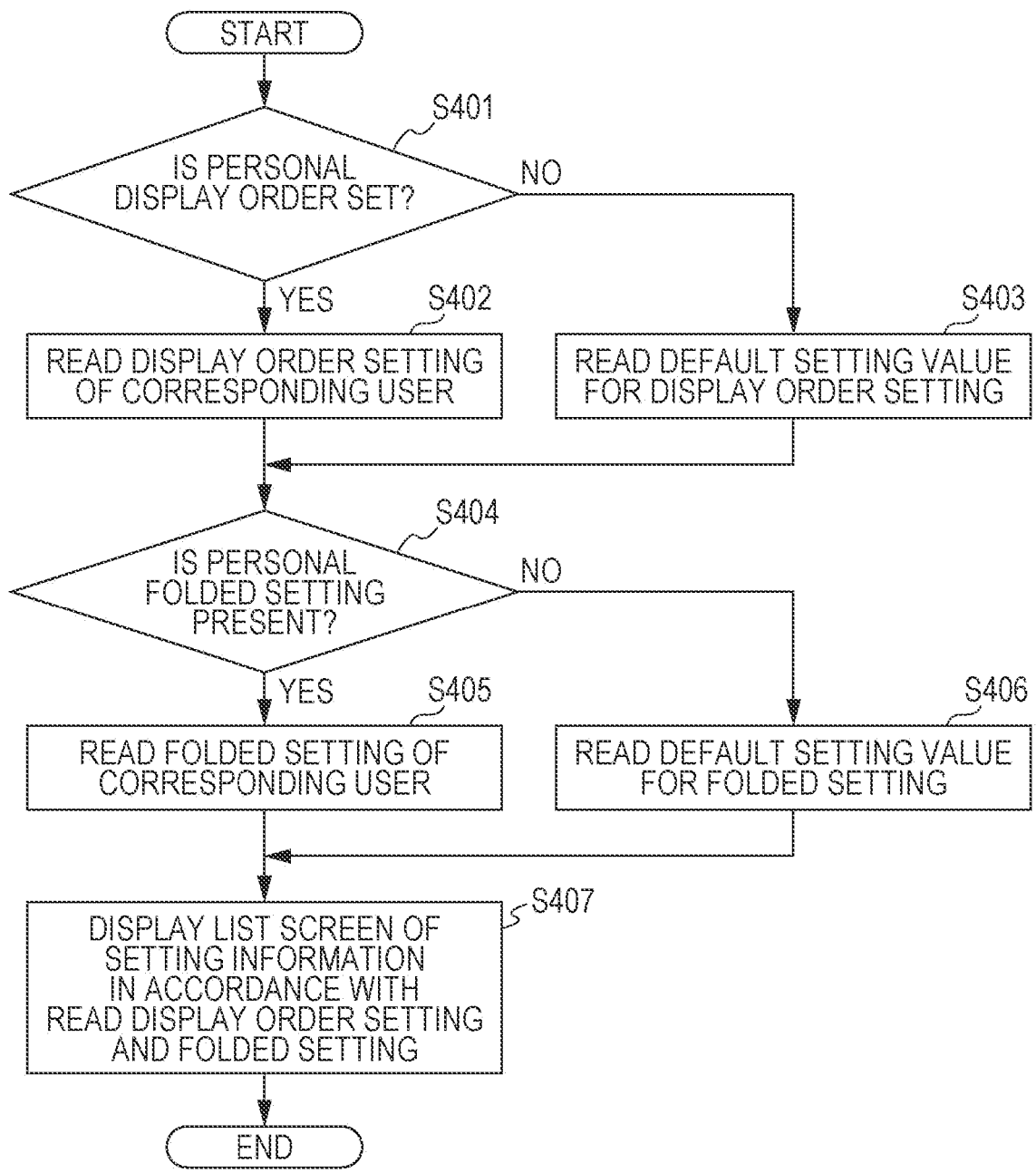
FIG. 18 is a flowchart illustrating a control process performed by a controller to individually set a display order of the setting information.

FIG. 18 is a flowchart illustrating a control process performed by the controller 35 to individually set the display order of the setting information.

When the list of the setting information is displayed, the controller 35 determines in step S401 whether a personal display order is set.

If it is determined in step S401 that the personal display order is set, the controller 35 reads the set personal display order in step S402. If it is determined in step S401 that the personal display order is not set, the controller 35 reads the default setting value of the display order in step S403.

The controller 35 determines in step S404 whether a personal folded setting is set.

If it is determined in step S404 that the personal folded setting is set, the controller 35 reads the folded setting of the user in step S405. If it is determined in step S404 that the personal folded setting is not set, the controller 35 reads the default setting value in the folded setting in step S406.

In step S407, the controller 35 displays the list screen of the setting information in accordance with the read display order settings and folded settings.

Examples of list display screens of the setting information displayed in accordance with the control processes described above are described with reference to FIGS. 19 through 22.

Figure 19:
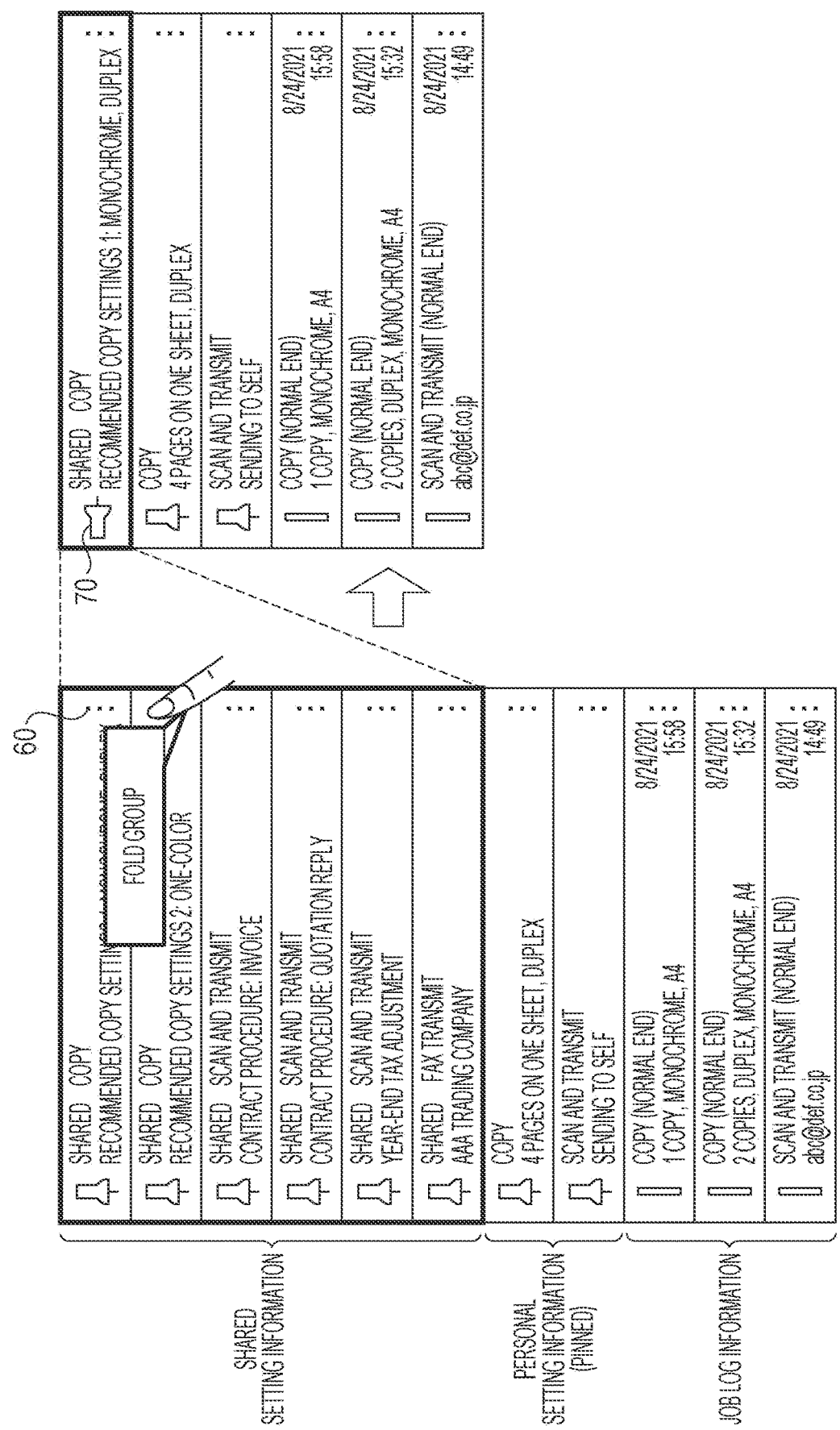
FIG. 19 illustrates an operation example performed when multiple pieces of the shared setting information are folded into a representative form of the shared setting information.

FIG. 19 illustrates an operation performed when multiple pieces of the shared setting information are displayed as a representative form of the shared setting information by folding the shared setting information.

Referring to FIG. 19, when the operation menu button 60 of the shared setting information is operated by a user, an operation menu including a setting item "fold group" is displayed. When the user selects the setting item "fold group" in FIG. 19, six pieces of the shared setting information are displayed in a single representative form of the shared setting information. In a piece of the shared setting information in the folded state, a pin mark 70 indicative of a pinned state is oriented in a lateral direction, indicating that the multiple pieces of the shared setting information are in the folded state. The name of the single piece of the setting information in the folded state is the name of the shared setting information placed at the top of the pieces of the shared setting information before being folded.

Figure 20:
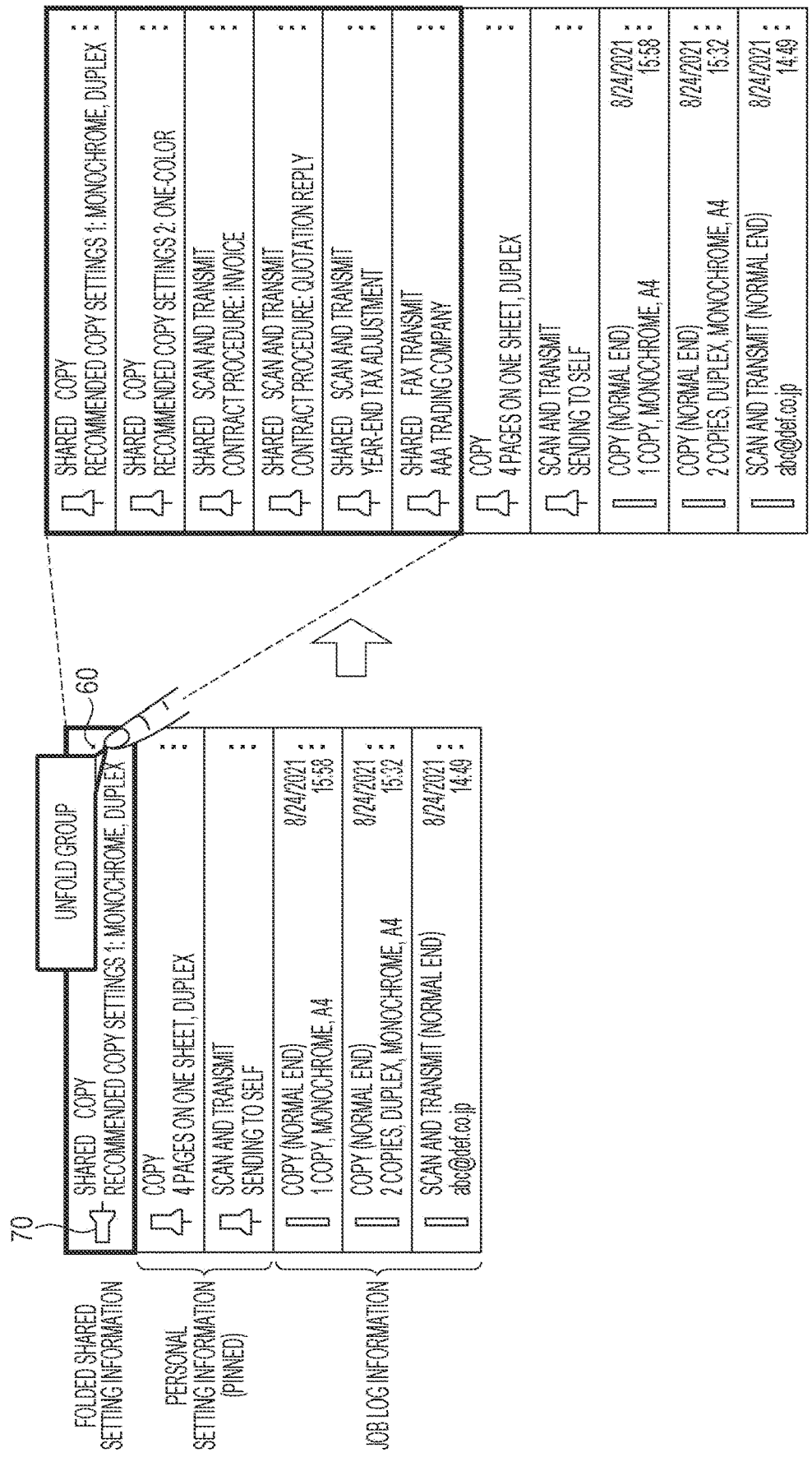
FIG. 20 illustrates how the user unfolds a folded representative form of the setting information into original six pieces of the setting information by operating the operation menu button in the shared setting information in the folded state.
Figure 21:
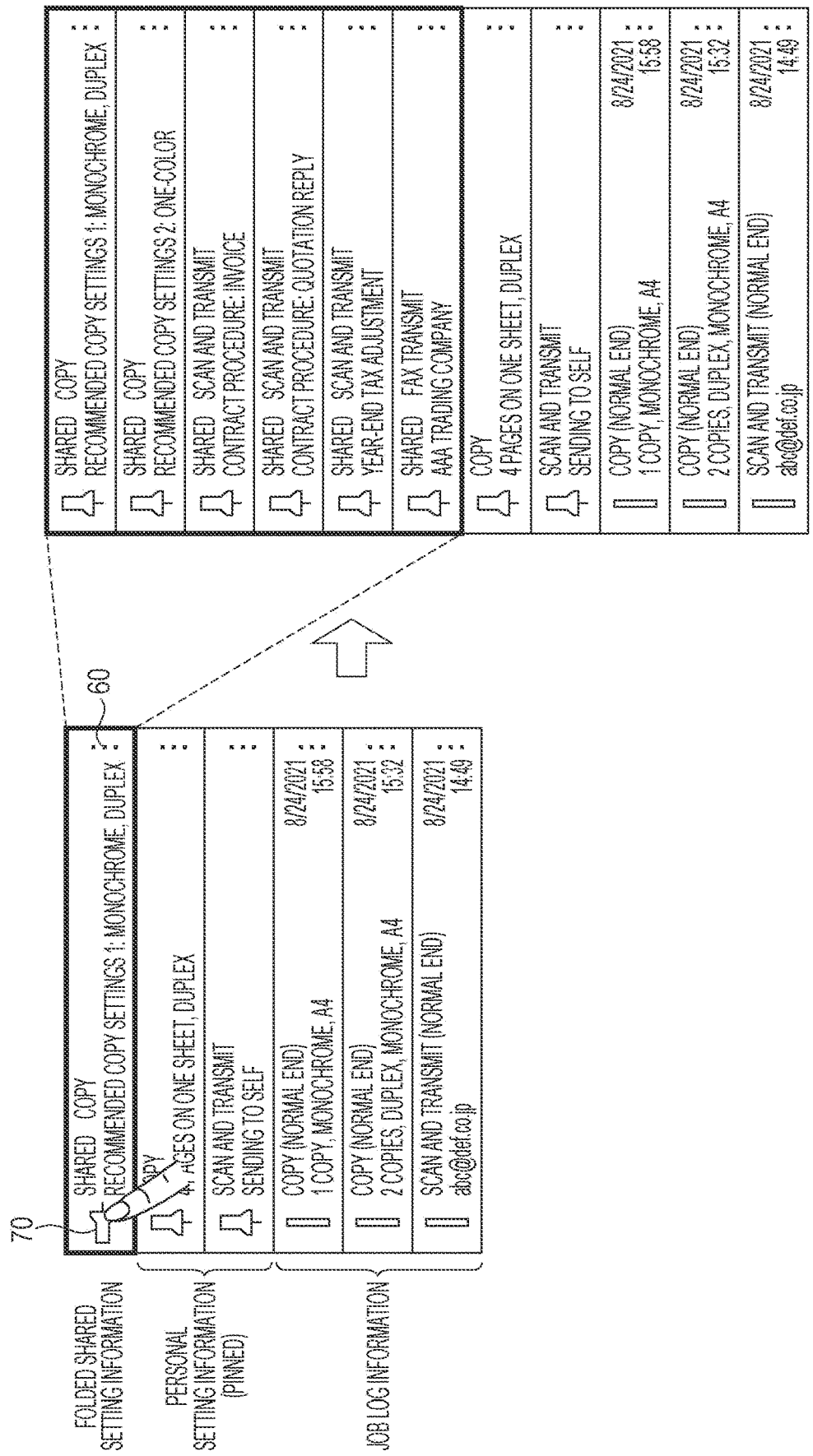
FIG. 21 illustrates how the user unfolds the folded representative form of the setting information into the original six pieces of the setting information by operating a pin mark oriented in a lateral direction.

FIGS. 20 and 21 illustrate an operation performed to restore the original state of the pieces of the shared setting information from the folded state of the single piece of the shared setting information.

Referring to FIG. 20, when the operation menu button 60 of the shared setting information in the folded state is operated by the user, an operation menu including a setting item "unfold group" is displayed. When the user selects the setting item "unfold group" in FIG. 20, the single piece of the shared setting information in the folded state is unfolded to the original six pieces of the shared setting information.

Referring to FIG. 21, when the user operates the laterally oriented pin mark 70, the single piece of the shared setting information in the folded state is unfolded and displayed as the original six pieces of the shared setting information.

Figure 22:
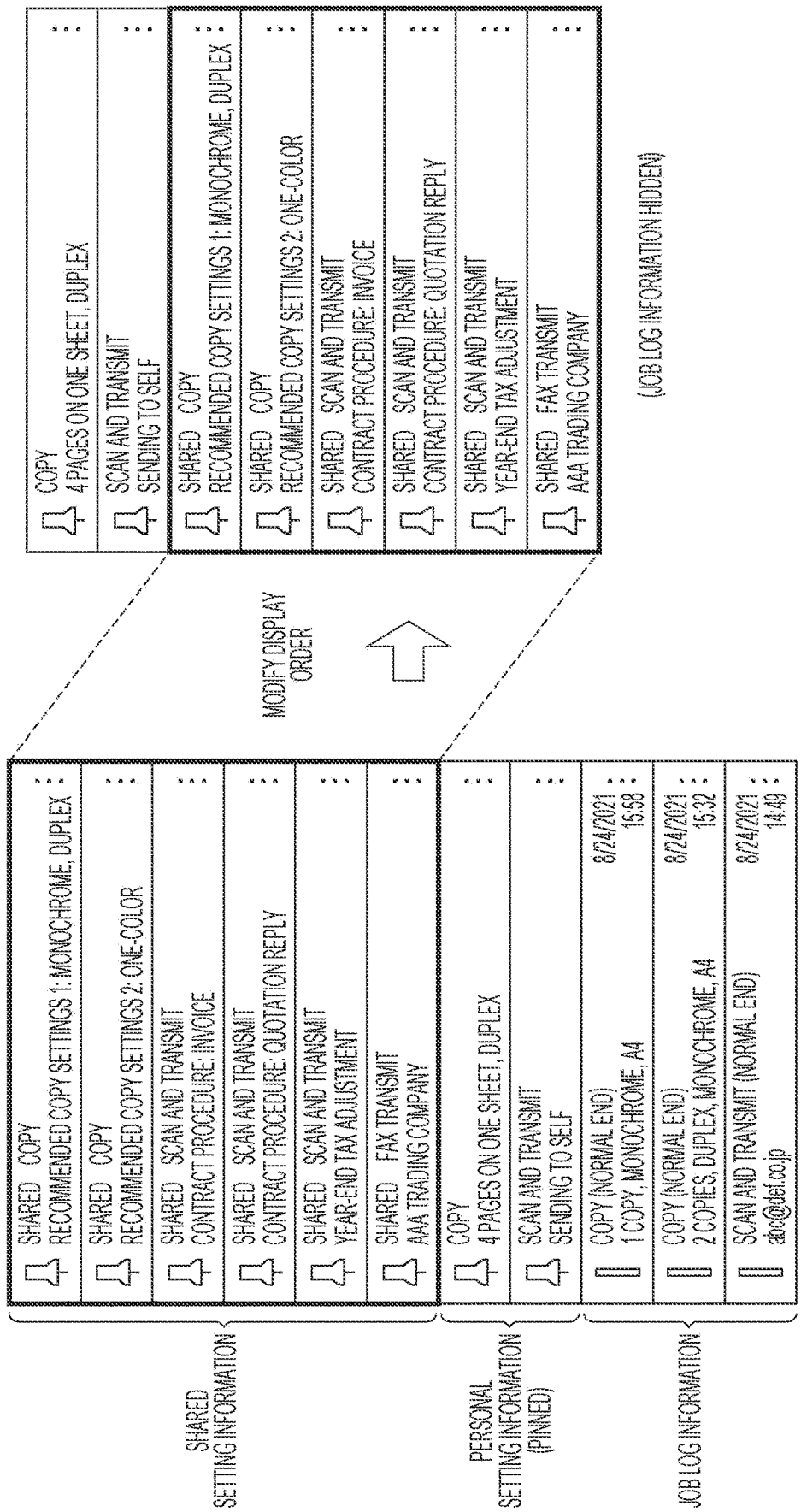
FIG. 22 illustrates a display screen example displayed when the display order of list display screens of the setting information is modified from a default setting value.

FIG. 22 illustrates a display screen displayed when the display order on the list display screen of the setting information is modified from the default setting value.

The display screen example in FIG. 22 indicates how the display order is modified when the pinned personal setting information is displayed above the shared setting information and the job log information is hidden. Referring to the list display screen of the setting information in FIG. 22 after the modification of the display order, two pieces of the personal setting information are displayed above six pieces of the shared setting information and the job log information is hidden.

As described above, only the authoritative user may delete the shared setting information in the image forming apparatus 10 of the exemplary embodiment. However, the authoritative user may delete accidentally the shared setting information that is not to be deleted. If the shared setting information used by a large number of users is deleted by the authoritative user, shared setting information identical to the deleted shared setting information may be produced and registered.

The image forming apparatus 10 of the exemplary embodiment temporarily stores in a temporary save region the deleted shared setting information such that the deleted shared setting information is restored in response to a simple operation of the authoritative user.

Operation examples to restore the deleted shared setting information are described with reference to FIGS. 23 through 25.

Figure 23:
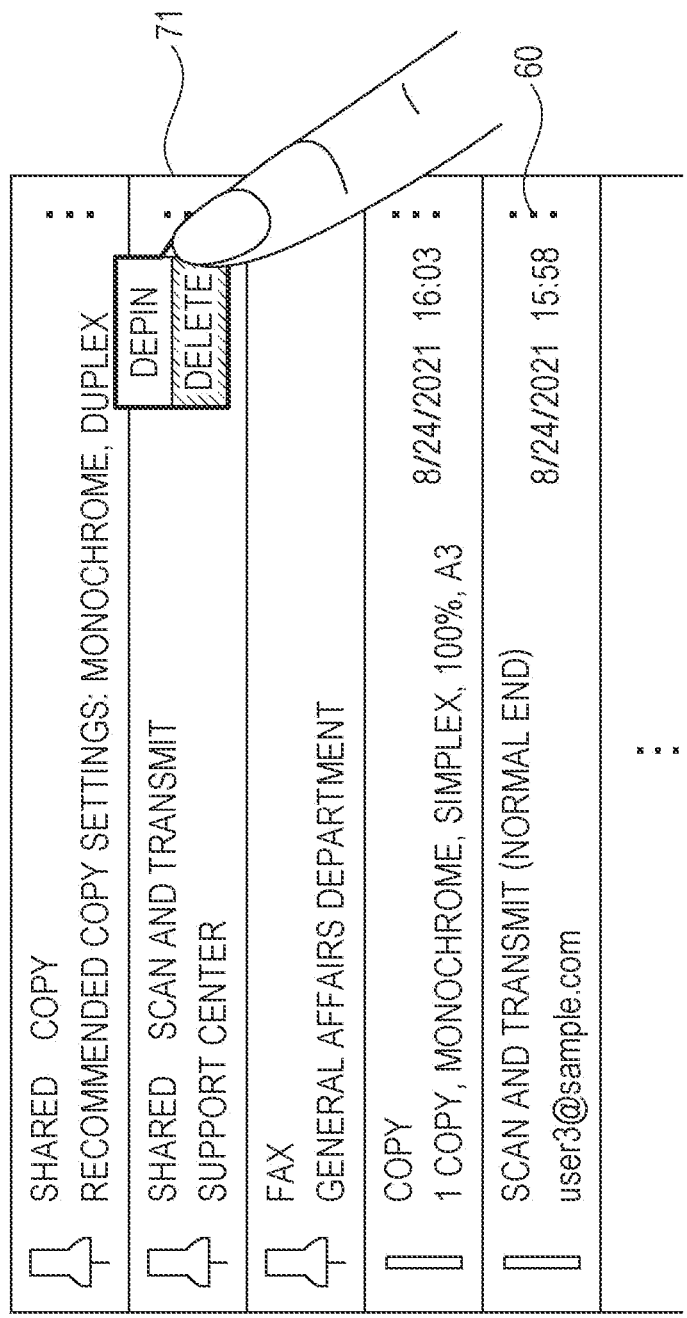
FIG. 23 illustrates how the authoritative user accidentally selects an operation item "delete" by operating an operation menu button of the shared setting information referred to as "support center"

In the display screen illustrated in FIG. 23, the authoritative user may now accidentally select the operation item "delete" of the operation menu button 60 of shared setting information 71 having the name "support center."

Referring to FIG. 24, the shared setting information 71 having the name "support center" is thus deleted from the list display screen of the setting information.

Figure 25:
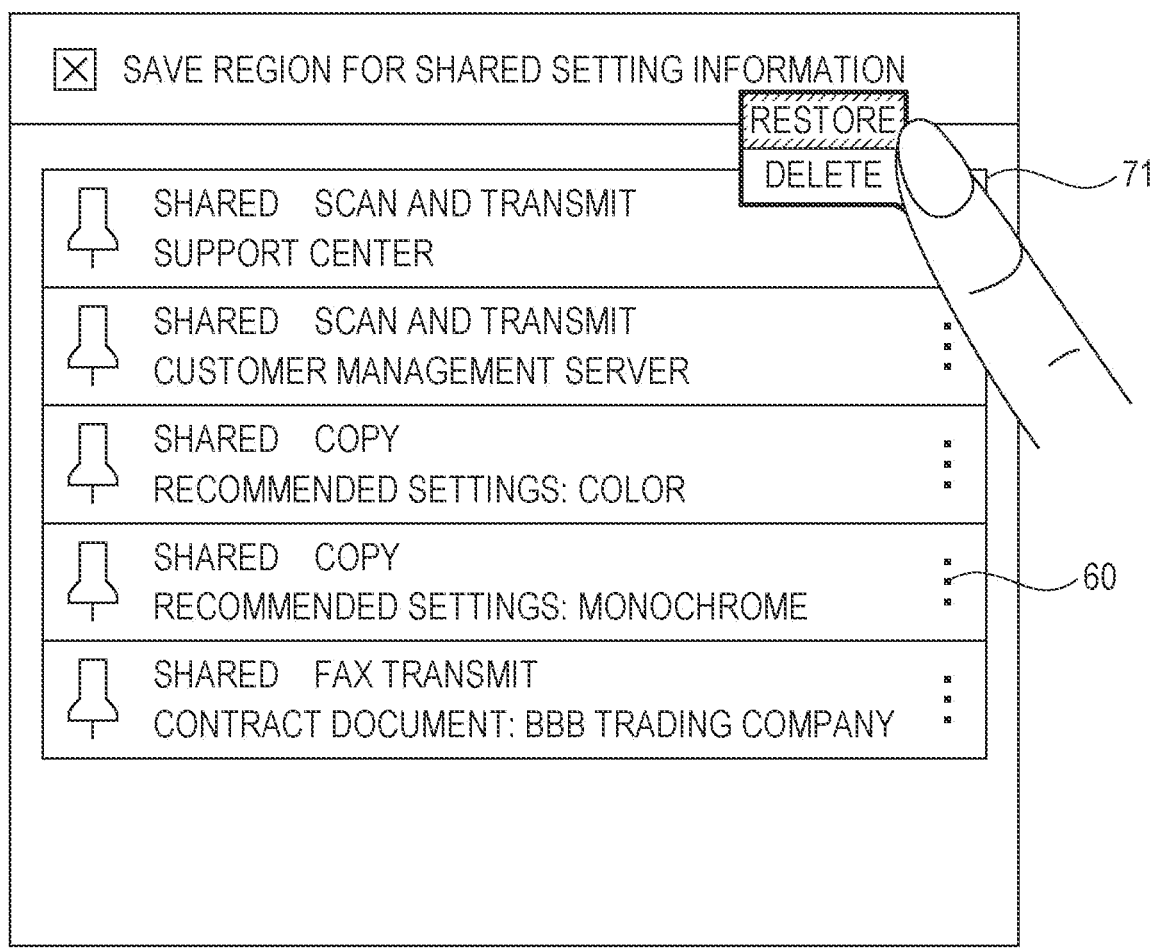
FIG. 25 illustrates how the authoritative user restores the deleted shared setting information referred to as the support center from a shared setting information save region.

The authoritative user may notice that he or she should not deleted the shared setting information 71 and may then display a shared setting information save region usable by only the authoritative user as illustrated in FIG. 25. The authoritative user operates the operation menu button 60 of the deleted shared setting information 71 having the name "support center" to select the operation item "restore." The shared setting information 71 having the name "support center," once deleted, is thus restored and displayed in the original state thereof on the list display screen of the setting information.

The save region for the shared setting information is used to store temporarily the deleted shared setting information. However, the continuous storage of the deleted shared setting information leads to consuming memory capacity. The shared setting information temporarily stored on the save region may thus be successively deleted.

For example, the controller 35 may delete the shared setting information on the save region after the elapse of a specific period of time, for example, 24 hours later. Alternatively, if the number of pieces of the shared setting information stored on the save region exceeds a predetermined upper limit number, for 20, the controller 35 may delete the shared setting information by a number of pieces of the information in excess of the upper limit number on an oldest-first basis.

The authoritative user may select a setting whether to entirely delete the shared setting information temporarily stored on the save region. For example, as illustrated in FIG. 26, if the number of pieces of the shared setting information temporarily stored exceeds the upper limit number with setting 1 selected by the authoritative user, the shared setting information is deleted on an oldest-first basis. If setting 2 is selected by the authoritative user, each piece of the shared setting information temporarily stored is successively deleted each time the predetermined period of time elapses.

Figure 27:
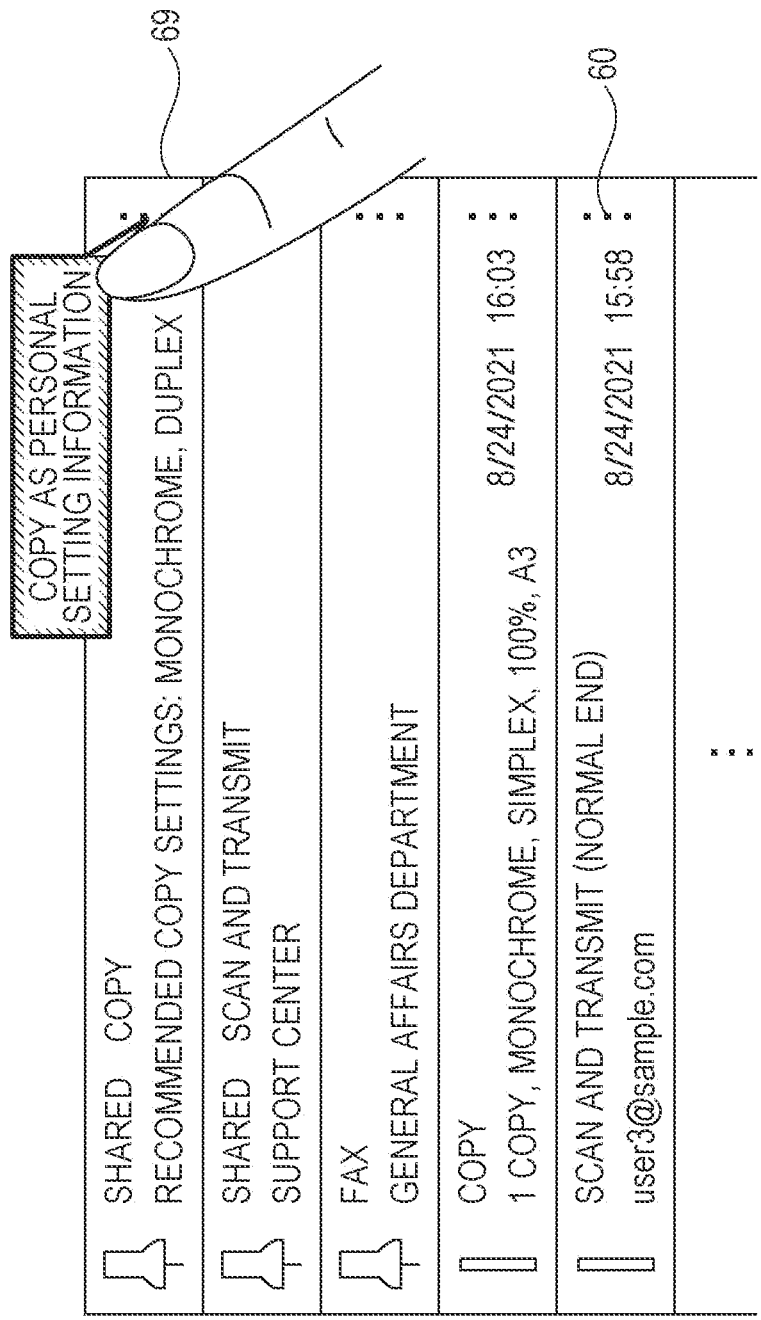
FIG. 27 illustrates an operation that a general user performs to modify the shared setting information to the personal setting information of the general user.

FIGS. 27 and 28 illustrate operation examples that the general user performs to modify the shared setting information to the general user's own personal setting information.

For example, the general user may use the shared setting information having a name "recommended copy settings" under the control of the general user and operate the operation menu button 60 of the shared setting information 69 as illustrated in FIG. 27. The display screen in FIG. 27 indicates the setting item "copy as personal setting information" and the general user may now select this setting item.

The shared setting information 69 remains intact as illustrated in FIG. 28 and personal setting information 72 having the same setting contents as the shared setting information 69 is generated and added on the list display screen.

The general user may modify part of the newly added personal setting information 72 or may delete the personal setting information 72 if the personal setting information 72 becomes unused.

Modifications

According to the exemplary embodiment, the present disclosure is applied to the image forming apparatus that forms an image on a recording medium. The present disclosure is not limited to the image forming apparatus. The present disclosure may be applied to an information processing apparatus that stores the setting information with a setting value at each setting item and performs a process using the stored setting information. Such information processing apparatus may be a personal computer or a mobile terminal apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
display a setting screen of setting information having on a per setting item basis a setting value used to perform a process, the setting information including personal setting information usable by only a specific user and shared setting information usable by a plurality of users; and
receive, from only an administrative user having a wider right than a general user of the information processing apparatus, an operation to register the personal setting information as the shared setting information.

2. The information processing apparatus according to claim 1, wherein the processor is configured to display to only the administrative user an operator used to register the personal setting information as the shared setting information.

3. The information processing apparatus according to claim 1, wherein the processor is configured to not display to the general user an operator used to register the personal setting information as the shared setting information.

4. The information processing apparatus according to claim 1, wherein the processor is configured to perform a predetermined authentication process such that the authoritative user is permitted to perform operations that the general user is not permitted to perform, the operations including the operation to register the personal setting information as the shared setting information.

5. The information processing apparatus according to claim 2, wherein the processor is configured to perform a predetermined authentication process such that the authoritative user is permitted to perform operations that the general user is not permitted to perform, the operations including the operation to register the personal setting information as the shared setting information.

6. The information processing apparatus according to claim 3, wherein the processor is configured to perform a predetermined authentication process such that the authoritative user is permitted to perform operations that the general user is not permitted to perform, the operations including the operation to register the personal setting information as the shared setting information.

7. The information processing apparatus according to claim 1, wherein the processor is configured to perform control to receive from the authoritative user an upper limit of a registerable number of pieces of the shared setting information and perform control not to receive the registration of a number of pieces of the shared setting information in excess of the upper limit.

8. The information processing apparatus according to claim 2, wherein the processor is configured to perform control to receive from the authoritative user an upper limit of a registerable number of pieces of the shared setting information and perform control not to receive the registration of a number of pieces of the shared setting information in excess of the upper limit.

9. The information processing apparatus according to claim 3, wherein the processor is configured to perform control to receive from the authoritative user an upper limit of a registerable number of pieces of the shared setting information and perform control not to receive the registration of a number of pieces of the shared setting information in excess of the upper limit.

10. The information processing apparatus according to claim 1, wherein the processor is configured to, when the setting screen is displayed, display the shared setting information above the personal setting information in a default setting state.

11. The information processing apparatus according to claim 10, wherein the processor is configured to, when the setting screen is displayed, receive, in response to an operation of the authoritative user or the general user,
a setting as to whether to display the shared setting information above the personal setting information or the personal setting information above the shared setting information.

12. The information processing apparatus according to claim 10, wherein the processor is configured to, when the setting screen is displayed, receive, in response to an operation of the authoritative user or the general user, a setting as to whether to display or hide each piece of the shared setting information, the personal setting information, and log information with the process performed.

13. The information processing apparatus according to claim 1, wherein the processor is configured to, when an operation of the authoritative user or the general user is received, display a plurality of pieces of the shared setting information in a representative form of the setting information, a plurality of pieces of the personal setting information in a representative form of the setting information, and a plurality of pieces of log information, with the process performed, in a representative form of the log information.

14. The information processing apparatus according to claim 13, wherein the processor is configured to, when the operation of the authoritative user or the general user is received, display the pieces of the setting information, the pieces of the personal setting information, or the pieces of the log information in an original separate form in place of the representative form.

15. The information processing apparatus according to claim 1, wherein the processor is configured to, when the shared setting information is deleted, store the deleted shared setting information on a temporary save region.

16. The information processing apparatus according to claim 15, wherein the processor is configured to, after an elapse of a preset time period, delete the shared setting information stored on the temporary save region or if a preset upper limit of a number of pieces of the shared setting information stored on the temporary save region is exceeded, delete the shared setting information stored on the temporary save region by a number of pieces falling above the preset upper limit on an oldest-first basis.

17. The information processing apparatus according to claim 1, wherein the processor is configured to, when an operation to make a copy of the shared setting information as the personal setting information is received, register, as the personal setting information on a user that has performed the operation, setting information having setting contents identical to setting contents of the shared setting information that has undergone the operation.

18. The information processing apparatus according to claim 17, wherein the processor is configured to receive, not only from the authoritative user but also from the general user, the operation to make the copy of the shared setting information as the personal setting information.

19. An information processing method comprising:

displaying a setting screen of setting information having on a per setting item basis a setting value used to perform a process, the setting information including personal setting information usable by only a specific user and shared setting information usable by a plurality of users; and receiving, from only an administrative user having a wider right than a general user of the information processing apparatus, an operation to register the personal setting information as the shared setting information.

20. A non-transitory computer readable medium storing a program causing a computer to execute a process, the process comprising:

displaying a setting screen of setting information having on a per setting item basis a setting value used to perform a process, the setting information including personal setting information usable by only a specific user and shared setting information usable by a plurality of users; and receiving, from only an administrative user having a wider right than a general user of the information processing apparatus, an operation to register the personal setting information as the shared setting information.

* * * * *